US011043694B2

(12) United States Patent
Zhamu et al.

(10) Patent No.: US 11,043,694 B2
(45) **Date of Patent: *Jun. 22, 2021**

(54) ALKALI METAL-SELENIUM SECONDARY BATTERY CONTAINING A CATHODE OF ENCAPSULATED SELENIUM PARTICLES

(71) Applicant: Global Graphene Group, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 419 days.

This patent is subject to a terminal disclaimer.

(21) Appl. No.: 15/954,046

(22) Filed: Apr. 16, 2018

(65) Prior Publication Data

US 2019/0319298 A1 Oct. 17, 2019

(51) Int. Cl.
*H01M 10/0525* (2010.01)
*H01M 10/054* (2010.01)
(Continued)

(52) U.S. Cl.
CPC ....... *H01M 10/0525* (2013.01); *H01M 4/366* (2013.01); *H01M 4/38* (2013.01);
(Continued)

(58) Field of Classification Search
CPC .......... H01M 4/366; H01M 4/38; H01M 4/58; H01M 4/62; H01M 10/0525
See application file for complete search history.

(56) References Cited

U.S. PATENT DOCUMENTS 2,798,878 A 7/1957 Hummers
3,836,511 A 9/1974 O'farrell et al.
(Continued)

FOREIGN PATENT DOCUMENTS

CN 103258990 A 8/2013
CN 105322132 A 2/2016
(Continued)

OTHER PUBLICATIONS

U.S. Appl. No. 15/434,632 Nonfinal Office Action dated Jun. 26, 2020, 19 pages.

(Continued)

*Primary Examiner* — James Lee

(57) ABSTRACT

Provided is a rechargeable alkali metal-selenium cell comprising an anode active material layer, an electrolyte, and a cathode active material layer containing multiple particulates of a selenium-containing material selected from a selenium-carbon hybrid, selenium-graphite hybrid, selenium-graphene hybrid, conducting polymer-selenium hybrid, a metal selenide, a Se alloy or mixture with Sn, Sb, Bi, S, or Te, a selenium compound, or a combination thereof and wherein at least one of the particulates comprises one or a plurality of selenium-containing material particles being embraced or encapsulated by a thin layer of an elastomer having a recoverable tensile strain no less than 5% when measured without an additive or reinforcement, a lithium ion conductivity no less than $10^{-7}$ S/cm at room temperature, and a thickness from 0.5 nm to 10 μm This battery exhibits an excellent combination of high selenium content, high selenium utilization efficiency, high energy density, and long cycle life.

37 Claims, 9 Drawing Sheets

(51) Int. Cl.

| | |
|---|---|
| ***H01M 4/587*** | (2010.01) |
| ***H01M 4/38*** | (2006.01) |
| ***H01M 4/36*** | (2006.01) |
| ***H01M 4/58*** | (2010.01) |
| ***H01M 4/62*** | (2006.01) |
| ***H01M 10/0565*** | (2010.01) |
| ***H01M 10/0569*** | (2010.01) |
| ***H01M 10/0568*** | (2010.01) |
| *H01M 4/02* | (2006.01) |

(52) U.S. Cl.

CPC ........... *H01M 4/581* (2013.01); *H01M 4/587* (2013.01); *H01M 4/5825* (2013.01); *H01M 4/622* (2013.01); *H01M 4/623* (2013.01); *H01M 4/625* (2013.01); *H01M 10/054* (2013.01); *H01M 10/0565* (2013.01); *H01M 10/0568* (2013.01); *H01M 10/0569* (2013.01); *H01M 2004/028* (2013.01)

(56) References Cited

U.S. PATENT DOCUMENTS

| | | | |
|---|---|---|---|
| 4,720,910 | A | 1/1988 | Rourke et al. |
| 5,057,339 | A | 10/1991 | Ogawa |
| 5,270,417 | A | 12/1993 | Soga et al. |
| 5,342,710 | A | 8/1994 | Koksbang |
| 5,350,647 | A | 9/1994 | Hope et al. |
| 5,409,785 | A | 4/1995 | Nakano et al. |
| 5,424,151 | A | 6/1995 | Koksbang et al. |
| 5,434,021 | A | 7/1995 | Fauteux et al. |
| 5,460,905 | A | 10/1995 | Skotheim |
| 5,536,599 | A | 7/1996 | Alamgir et al. |
| 5,648,187 | A | 7/1997 | Skotheim |
| 5,961,672 | A | 10/1999 | Skotheim et al. |
| 6,025,094 | A | 2/2000 | Visco et al. |
| 6,218,055 | B1 | 4/2001 | Shah et al. |
| 6,447,952 | B1 | 9/2002 | Spiegel et al. |
| 6,451,484 | B1 | 9/2002 | Han et al. |
| 6,475,678 | B1 | 11/2002 | Suzuki |
| 6,515,101 | B1 | 2/2003 | Sheares |
| 6,620,547 | B1 | 9/2003 | Sung et al. |
| 6,733,924 | B1 | 5/2004 | Skotheim et al. |
| 6,797,428 | B1 | 9/2004 | Skotheim et al. |
| 6,936,381 | B2 | 8/2005 | Skotheim et al. |
| 7,247,408 | B2 | 7/2007 | Skotheim et al. |
| 7,282,295 | B2 | 10/2007 | Visco et al. |
| 7,282,296 | B2 | 10/2007 | Visco et al. |
| 7,282,302 | B2 | 10/2007 | Visco et al. |
| 7,618,678 | B2 | 11/2009 | Mao et al. |
| 8,597,828 | B2 | 12/2013 | Martinet et al. |
| 9,905,856 | B1 | 2/2018 | Zhamu et al. |
| 10,084,182 | B2 | 9/2018 | Pan et al. |
| 10,483,533 | B2 | 11/2019 | Zhamu et al. |
| 10,629,899 | B1 | 4/2020 | Jang |
| 2002/0034685 | A1 | 3/2002 | Sato et al. |
| 2002/0182488 | A1 | 12/2002 | Cho et al. |
| 2002/0195591 | A1 | 12/2002 | Ravet et al. |
| 2003/0180619 | A1 | 9/2003 | Tamura et al. |
| 2004/0018430 | A1 | 1/2004 | Holman et al. |
| 2005/0034993 | A1 | 2/2005 | Gozdz et al. |
| 2005/0098914 | A1 | 5/2005 | Varma et al. |
| 2005/0118508 | A1 | 6/2005 | Yong et al. |
| 2005/0136330 | A1 | 6/2005 | Mao et al. |
| 2006/0263697 | A1 | 11/2006 | Dahn et al. |
| 2007/0059600 | A1 | 3/2007 | Kim et al. |
| 2007/0218369 | A1 | 9/2007 | Kaiduka et al. |
| 2007/0289879 | A1 | 12/2007 | Horton |
| 2008/0248393 | A1 | 10/2008 | Richard et al. |
| 2008/0318128 | A1 | 12/2008 | Simoneau et al. |
| 2009/0155676 | A1 | 6/2009 | Zhamu et al. |
| 2009/0169725 | A1 | 7/2009 | Zhamu et al. |
| 2009/0186093 | A1 | 7/2009 | Liu et al. |
| 2010/0099029 | A1 | 4/2010 | Kinoshita et al. |
| 2010/0112454 | A1 | 5/2010 | Visco et al. |
| 2010/0143798 | A1 | 6/2010 | Zhamu et al. |
| 2010/0173198 | A1 | 7/2010 | Zhamu et al. |
| 2011/0059361 | A1 | 3/2011 | Wilkening et al. |
| 2011/0104571 | A1 | 5/2011 | Zhamu et al. |
| 2011/0143211 | A1 | 6/2011 | Takeyama |
| 2011/0177388 | A1 | 7/2011 | Bae et al. |
| 2011/0244337 | A1 | 10/2011 | Ohta et al. |
| 2011/0262816 | A1 | 10/2011 | Amatucci |
| 2012/0064409 | A1 | 3/2012 | Zhamu et al. |
| 2012/0070708 | A1 | 3/2012 | Ohira et al. |
| 2012/0070746 | A1 | 3/2012 | Mikhaylik et al. |
| 2012/0088154 | A1 | 4/2012 | Liu et al. |
| 2013/0052544 | A1 | 2/2013 | Ohkubo et al. |
| 2013/0054061 | A1 | 2/2013 | Nishimoto |
| 2013/0157141 | A1 | 6/2013 | Zhong et al. |
| 2013/0164615 | A1 | 6/2013 | Manthiram et al. |
| 2013/0171339 | A1 | 7/2013 | Wang et al. |
| 2013/0224603 | A1 | 8/2013 | Chen et al. |
| 2013/0292613 | A1 | 11/2013 | Wegner et al. |
| 2014/0072879 | A1 | 3/2014 | Chen et al. |
| 2014/0147738 | A1 | 5/2014 | Chen et al. |
| 2014/0147751 | A1 | 5/2014 | Yang et al. |
| 2014/0154572 | A1 | 6/2014 | Singh et al. |
| 2014/0162121 | A1 | 6/2014 | Ryu et al. |
| 2014/0178747 | A1 | 6/2014 | Tsai et al. |
| 2014/0234702 | A1 | 8/2014 | Zhang et al. |
| 2014/0235513 | A1 | 8/2014 | Kverel et al. |
| 2014/0363746 | A1 | 12/2014 | He et al. |
| 2015/0044556 | A1 | 2/2015 | Wang et al. |
| 2015/0064568 | A1 | 3/2015 | Yushin et al. |
| 2015/0064574 | A1 | 3/2015 | He et al. |
| 2015/0079485 | A1 | 3/2015 | Choi et al. |
| 2015/0162641 | A1 | 6/2015 | Visco et al. |
| 2015/0180000 | A1 | 6/2015 | Roumi |
| 2015/0180037 | A1 | 6/2015 | Gronwald et al. |
| 2015/0218323 | A1 | 8/2015 | Kim et al. |
| 2015/0221935 | A1 | 8/2015 | Zhou et al. |
| 2015/0236372 | A1 | 8/2015 | Yushin et al. |
| 2015/0244025 | A1 | 8/2015 | Rhee et al. |
| 2015/0318532 | A1 | 11/2015 | Manthiram et al. |
| 2015/0325844 | A1 | 11/2015 | Inoue |
| 2015/0372294 | A1 | 12/2015 | Minami et al. |
| 2016/0013481 | A1 | 1/2016 | Jeong et al. |
| 2016/0043384 | A1 | 2/2016 | Zhamu et al. |
| 2016/0087266 | A1 | 3/2016 | Muldoon et al. |
| 2016/0126543 | A1 | 5/2016 | Ota et al. |
| 2016/0149216 | A1 | 5/2016 | Mizuno et al. |
| 2016/0181585 | A1 | 6/2016 | Choi et al. |
| 2016/0181611 | A1 | 6/2016 | Cho et al. |
| 2016/0204431 | A1 | 7/2016 | Sawa |
| 2016/0218341 | A1 | 7/2016 | Kumar et al. |
| 2016/0240896 | A1 | 8/2016 | Zhang et al. |
| 2016/0301075 | A1 | 10/2016 | Zhamu et al. |
| 2016/0344035 | A1 | 11/2016 | Zhamu et al. |
| 2016/0351877 | A1 | 12/2016 | Kusachi et al. |
| 2016/0351909 | A1 | 12/2016 | Bittner et al. |
| 2016/0372743 | A1 | 12/2016 | Cho et al. |
| 2016/0372784 | A1 | 12/2016 | Hayner et al. |
| 2017/0002154 | A1 | 1/2017 | Hiasa et al. |
| 2017/0018799 | A1 | 1/2017 | Jeong |
| 2017/0033357 | A1 | 2/2017 | Cho et al. |
| 2017/0047584 | A1 | 2/2017 | Hwang et al. |
| 2017/0062827 | A1 | 3/2017 | Bruckmeier et al. |
| 2017/0062830 | A1 | 3/2017 | Bao et al. |
| 2017/0092986 | A1 | 3/2017 | Ogawa et al. |
| 2017/0098824 | A1 | 4/2017 | Fasching et al. |
| 2017/0098856 | A1 | 4/2017 | Zhamu et al. |
| 2017/0104204 | A1 | 4/2017 | Zhamu et al. |
| 2017/0104217 | A1 | 4/2017 | Yu et al. |
| 2017/0117535 | A1 | 4/2017 | Yoon et al. |
| 2017/0117538 | A1 | 4/2017 | Bendimerad et al. |
| 2017/0117589 | A1 | 4/2017 | Tajima et al. |
| 2017/0141387 | A1 | 5/2017 | Hayner et al. |
| 2017/0141399 | A1 | 5/2017 | Lux et al. |
| 2017/0166722 | A1 | 6/2017 | Zhamu et al. |
| 2017/0179468 | A1 | 6/2017 | Fanous et al. |
| 2017/0194640 | A1 | 7/2017 | Bucur et al. |
| 2017/0194648 | A1 | 7/2017 | Bucur et al. |
| 2017/0200943 | A1 | 7/2017 | Kawakami |

(56) References Cited

U.S. PATENT DOCUMENTS

| | | | |
|---|---|---|---|
| 2017/0207484 | A1 | 7/2017 | Zhamu et al. |
| 2017/0279125 | A1 | 9/2017 | Ohsawa et al. |
| 2017/0288211 | A1 | 10/2017 | Zhamu et al. |
| 2017/0294643 | A1 | 10/2017 | Burshtain et al. |
| 2017/0309917 | A1 | 10/2017 | Lee et al. |
| 2017/0338472 | A1 | 11/2017 | Zhamu et al. |
| 2017/0338474 | A1 | 11/2017 | Lee et al. |
| 2017/0338490 | A1 | 11/2017 | Xiao et al. |
| 2018/0053978 | A1 | 2/2018 | Song et al. |
| 2018/0083265 | A1 | 3/2018 | Singh et al. |
| 2018/0190975 | A1 | 7/2018 | Ishii et al. |
| 2018/0219215 | A1 | 8/2018 | Bucur et al. |
| 2018/0233736 | A1 | 8/2018 | Zhamu et al. |
| 2018/0241031 | A1 | 8/2018 | Pan et al. |
| 2018/0241032 | A1 | 8/2018 | Pan et al. |
| 2018/0248173 | A1 | 8/2018 | Pan et al. |
| 2018/0277913 | A1 | 9/2018 | Pan et al. |
| 2018/0287142 | A1 | 10/2018 | Zhamu et al. |
| 2018/0294475 | A1 | 10/2018 | Zhamu et al. |
| 2018/0294476 | A1 | 10/2018 | Zhamu et al. |
| 2018/0301707 | A1 | 10/2018 | Pan et al. |
| 2019/0051905 | A1 | 2/2019 | Zhamu et al. |
| 2019/0058185 | A1 | 2/2019 | Lee et al. |
| 2019/0077669 | A1 | 3/2019 | Zhamu et al. |
| 2019/0081325 | A1 | 3/2019 | Takeda et al. |
| 2019/0088958 | A1 | 3/2019 | Viner et al. |
| 2019/0260028 | A1 | 8/2019 | Zhamu et al. |
| 2019/0319303 | A1 | 10/2019 | Kushida et al. |
| 2019/0386332 | A1 | 12/2019 | Zhamu et al. |
| 2019/0393466 | A1 | 12/2019 | Lin et al. |
| 2019/0393495 | A1 | 12/2019 | He et al. |
| 2019/0393510 | A1 | 12/2019 | He et al. |
| 2019/0393543 | A1 | 12/2019 | Zhamu et al. |

FOREIGN PATENT DOCUMENTS

| | | | |
|---|---|---|---|
| CN | 108899472 | A | 11/2018 |
| EP | 2787563 | A1 | 10/2014 |
| JP | 1275613 | A | 11/1989 |
| JP | 2010160984 | A | 7/2010 |
| JP | 2011524611 | A | 9/2011 |
| JP | 2015084320 | A | 4/2015 |
| JP | 2015176656 | A | 10/2015 |
| KR | 1020030050475 | A | 6/2003 |
| KR | 100670527 | B1 | 1/2007 |
| KR | 1020100138607 | A | 12/2010 |
| KR | 1020140101640 | A | 8/2014 |
| KR | 20160052351 | A | 5/2016 |
| KR | 1020160085386 | A | 7/2016 |
| KR | 1020160087511 | A | 7/2016 |
| KR | 1020170001069 | U | 3/2017 |
| KR | 1020170086003 | A | 7/2017 |
| KR | 1020170126404 | A | 11/2017 |
| KR | 1020180035752 | A | 4/2018 |
| WO | 2007108424 | A1 | 9/2007 |
| WO | 2015141799 | A1 | 9/2015 |
| WO | 2016015915 | A1 | 2/2016 |
| WO | 2017172104 | A1 | 10/2017 |
| WO | 2017200798 | A1 | 11/2017 |
| WO | 2018075538 | A1 | 4/2018 |
| WO | 2018148090 | A1 | 8/2018 |

OTHER PUBLICATIONS

U.S. Appl. No. 15/442,803 Nonfinal Office Action dated Jul. 20, 2020, 8 pages.

U.S. Appl. No. 15/483,347 Nonfinal Office Action dated Jun. 17, 2020, 14 pages.

U.S. Appl. No. 16/010,225 Final Office Action dated Jul. 8, 2020, 7 pages.

U.S. Appl. No. 16/114,959 Final Office Action dated Jul. 22, 2020, 6 pages.

U.S. Appl. No. 16/116,329 Final Office Action dated Jul. 23, 2020, 6 pages.

U.S. Appl. No. 16/116,341 Final Office Action dated Jul. 23, 2020, 6 pages.

U.S. Appl. No. 16/126,736 Final Office Action dated Jul. 23, 2020, 6 pages.

U.S. Appl. No. 16/126,745 Final Office Action dated Jul. 23, 2020, 6 pages.

U.S. Appl. No. 16/256,321 Nonfinal Office Action dated Jul. 27, 2020, 8 pages.

Arai et al., "Versatile supramolecular cross-linker: a rotaxane cross-linker that directly endows vinyl polymers with movable cross-links" Chemistry (2013) vol. 19, pp. 5917-5923.

Buonerba et al., "Novel Synthetic Strategy for the Sulfonation of Polybutadiene and Styrene-Butadiene Copolymers" Macromolecules (2013) vol. 46, pp. 778-784.

Elabd et al., "Sulfonation and Characterization of Poly(styrene-isobutylene-styrene) Triblock Copolymers at High Ion-Exchange Capacities" Polymer (2004) vol. 45, pp. 3037-3043.

Ji et al., "A highly ordered nanostructured carbon-sulphur cathode for lithium-sulphur batteries" Nature Materials (2009) vol. 8, pp. 500-506.

PCT/US17/18452 International Search Report and Written Opinion dated Apr. 25, 2017, 9 pages.

PCT/US18/16404 International Search Report and Written Opinion dated Apr. 13, 2018, 11 pages.

PCT/US18/16410 International Search Report and Written Opinion dated Apr. 20, 2018, 10 pages.

PCT/US18/16418 International Search Report and Written Opinion dated Apr. 25, 2018, 9 pages.

PCT/US18/16423 International Search Report and Written Opinion dated Apr. 24, 2018, 9 pages.

PCT/US18/16426 International Search Report and Written Opinion dated Apr. 24, 2018, 9 pages.

PCT/US18/16431 International Search Report and Written Opinion dated Apr. 26, 2018, 6 pages.

PCT/US18/20892 International Search Report and Written Opinion dated May 2, 2018, 6 pages.

Xie et al., "A Novel Method for Synthesis of Sulfonated SBS Ionomers by Ring-Opening Reaction of Epoxidized SBS, Their Characterization, Properties, and Blends" Journal of Elastomers and Plastics (2007) vol. 39, pp. 317-334.

Choi et al., "Highly elastic binders integrating polyrotaxanes for silicon microparticle anodes in lithium ion batteries" Science (2017) vol. 357, No. 6348, pp. 279-283.

KR-10-2015-0044333 English language translation.

PCT/US18/25160 International Search Report and Written Opinion dated Nov. 21, 2018, 12 pages.

PCT/US18/43421 International Search Report and Written Report dated Oct. 11, 2018, 13 pages.

PCT/US18/43435 International Search Report and Written Opinion dated Jan. 7, 2019, 14 pages.

U.S. Appl. No. 14/999,080 Nonfinal Office Action dated Nov. 9, 2018.

U.S. Appl. No. 15/442,803 Nonfinal Office Action dated Dec. 28, 2018, 24 pages.

U.S. Appl. No. 15/442,807 Nonfinal Office Action dated Dec. 14, 2018, 7 pages.

U.S. Appl. No. 15/483,342 Final Office Action dated Mar. 22, 2019, 52 pages.

U.S. Appl. No. 15/483,342 Nonfinal Office Action dated Nov. 2, 2018, 37 pages.

U.S. Appl. No. 15/483,347 Final Office Action dated Apr. 16, 2019, 23 pages.

U.S. Appl. No. 15/483,347 Nonfinal Office Action dated Nov. 2, 2018, 20 pages.

U.S. Appl. No. 15/483,348 Final Office Action dated Apr. 9, 2019, 28 pages.

U.S. Appl. No. 15/483,348 Nonfinal Office Action dated Nov. 21, 2018, 22 pages.

Wikipedia contributors. "Anode." Wikipedia, The Free Encyclopedia, Mar. 4, 2019, Web. Mar. 18, 2019. (Year: 2019).

(56) References Cited

OTHER PUBLICATIONS

Wikipedia contributors. “Molar mass distribution.” Wikipedia, The Free Encyclopedia, Feb. 1, 2019, Web. Mar. 18, 2019. (Year: 2019).
“Nylon” en.wikipedia.org/wiki/Nylon. Accessed Feb. 18, 2020 (Year: 2020).
Eftekhari “The rise of lithium-selenium batteries” Sustainable Energy & Fuels (2017) vol. 1, pp. 14-29.
PCT/US19/27147 International Search Report and Written Opinion dated Aug. 1, 2019, 16 pages.
PCT/US19/36748 International Search Report and Written Opinion dated Oct. 16, 2019, 11 pages.
PCT/US19/37690 International Search Report and Written Opinion dated Oct. 18, 2019, 18 pages.
PCT/US19/37692 International Search Report and Written Opinion dated Oct. 21, 2019, 18 pages.
PCT/US19/37700 International Search Report and Written Opinion dated Oct. 23, 2019, 17 pages.
PCT/US19/38367 International Search Report and Written Opinion dated Oct. 18, 2019, 17 pages.
PCT/US19/38368 International Search Report and Written Opinion dated Oct. 18, 2019, 18 pages.
PCT/US19/38436 International Search Report and Written Opinion dated Oct. 16, 2019, 17 pages.
PCT/US19/38455 International Search Report and Written Opinion dated Oct. 18, 2019, 10 pages.
PCT/US19/38456 International Search Report and Written Opinion dated Oct. 16, 2019, 16 pages.
PCT/US19/38881 International Search Report and Written Opinion dated Oct. 18, 2019, 14 pages.
PCT/US19/47642 International Search Report and Written Opinion dated Dec. 6, 2019, 16 pages.
PCT/US19/48084 International Search Report and Written Opinion dated Dec. 16, 2019, 9 pages.
PCT/US19/55758 International Search Report and Written Opinion dated Jan. 31, 2020, 15 pages.
U.S. Appl. No. 14/999,080 Nonfinal Office Action dated Oct. 30, 2019, 15 pages.
U.S. Appl. No. 15/434,632 Final Office Action dated Dec. 26, 2019, 20 pages.
U.S. Appl. No. 15/442,278 Final Office Action dated Oct. 21, 2019, 16 pages.
U.S. Appl. No. 15/442,803 Final Office Action dated Feb. 24, 2020, 36 pages.
U.S. Appl. No. 15/442,803 Nonfinal Office Action dated Jul. 25, 2019, 37 pages.
U.S. Appl. No. 15/478,125 Final Office Action dated Aug. 23, 2019, 14 pages.
U.S. Appl. No. 15/483,347 Final Office Action dated Dec. 27, 2019, 22 pages.
U.S. Appl. No. 15/483,347 Nonfinal Office Action dated Sep. 17, 2019, 20 pages.
U.S. Appl. No. 15/483,348 Advisory Action dated Jul. 18, 2019, 9 pages.
U.S. Appl. No. 15/483,348 Final Office Action dated Jan. 20, 2020, 9 pages.
U.S. Appl. No. 15/483,348 Nonfinal Office Action dated Sep. 16, 2019, 22 pages.
U.S. Appl. No. 15/676,677 Nonfinal Office Action dated Feb. 5, 2020, 15 pages.
U.S. Appl. No. 15/903,808 Nonfinal Office Action dated Jan. 28, 2020, 8 pages.
U.S. Appl. No. 15/910,465 Nonfinal Office Action dated Nov. 1, 2019, 12 pages.
U.S. Appl. No. 15/910,471 Non-final Office Action dated Nov. 8, 2019, 12 pages.
U.S. Appl. No. 15/914,216 Final Office Action dated Dec. 19, 2019, 9 pages.
U.S. Appl. No. 16/010,965 Nonfinal Office Action dated Jan. 8, 2020, 5 pages.
U.S. Appl. No. 16/010,975 Nonfinal Office Action dated Jan. 8, 2020, 5 pages.
U.S. Appl. No. 16/014,623 Nonfinal Office Action dated Oct. 4, 2019, 8 pages.
U.S. Appl. No. 16/017,294 Nonfinal Office Action dated Jan. 23, 2020, 6 pages.
U.S. Appl. No. 16/113,676 Nonfinal Office Action dated Oct. 4, 2019, 9 pages.
U.S. Appl. No. 16/120,875 Nonfinal Office Action dated Oct. 4, 2019, 10 pages.
U.S. Appl. No. 16/123,218 Nonfinal Office Action dated Oct. 4, 2019, 9 pages.
U.S. Appl. No. 16/166,574 Nonfinal Office Action dated Oct. 4, 2019, 9 pages.
AZO Materials Table of Properties on Styrene Butadiene Rubber, 5 pages.
PCT/US20/14869 International Search Report and Written Opinion dated May 19, 2020, 13 pages.
U.S. Appl. No. 15/442,278 Nonfinal Office Action dated Feb. 28, 2020, 16 pages.
U.S. Appl. No. 15/478,125 Nonfinal Office Action dated Mar. 5, 2020, 11 pages.
U.S. Appl. No. 15/485,934 Nonfinal Office Action dated May 26, 2020, 12 pages.
U.S. Appl. No. 15/676,680 Nonfinal Office Action dated May 20, 2020, 8 pages.
U.S. Appl. No. 15/903,788 Nonfinal Office Action dated Jun. 4, 2020, 11 pages.
U.S. Appl. No. 15/903,808 Final Office Action dated May 15, 2020, 9 pages.
U.S. Appl. No. 15/910,465 Final Office Action dated May 15, 2020, 13 pages.
U.S. Appl. No. 15/910,471 Nonfinal Office Action dated May 13, 2020, 11 pages.
U.S. Appl. No. 15/954,088 Nonfinal Office Action dated Mar. 13, 2020, 9 pages.
U.S. Appl. No. 16/010,213 Nonfinal Office Action dated Mar. 27, 2020, 12 pages.
U.S. Appl. No. 16/010,225 Nonfinal Office Action dated Mar. 27, 2020, 13 pages.
U.S. Appl. No. 16/014,623 Final Office Action dated Apr. 9, 2020, 14 pages.
U.S. Appl. No. 16/112,208 Nonfinal Office Action dated Apr. 2, 2020, 7 pages.
U.S. Appl. No. 16/112,225 Nonfinal Office Action dated May 13, 2020, 9 pages.
U.S. Appl. No. 16/113,676 Final Office Action dated Apr. 9, 2020, 15 pages.
U.S. Appl. No. 16/116,329 Nonfinal Office Action dated Mar. 30, 2020, 6 pages.
U.S. Appl. No. 16/116,341 Nonfinal Office Action dated Mar. 30, 2020, 6 pages.
U.S. Appl. No. 16/120,875 Final Office Action dated Apr. 9, 2020, 14 pages.
U.S. Appl. No. 16/123,218 Final Office Action dated Apr. 9, 2020, 13 pages.
U.S. Appl. No. 16/126,736 Nonfinal Office Action dated Mar. 30, 2020, 6 pages.
U.S. Appl. No. 16/126,745 Nonfinal Office Action dated Mar. 30, 2020, 6 pages.
U.S. Appl. No. 16/160,257 Nonfinal Office Action dated Apr. 3, 2020, 16 pages.
U.S. Appl. No. 16/166,536 Nonfinal Office Action dated May 14, 2020, 5 pages.
U.S. Appl. No. 16/166,574 Final Office Action dated Apr. 9, 2020, 12 pages.
U.S. Appl. No. 16/238,052 Nonfinal Office Action dated Apr. 3, 2020, 14 pages.
U.S. Appl. No. 16/256,346 Nonfinal Office Action dated May 19, 2020, 16 pages.
An et al., “Diameter-Selected Synthesis of Single Crystalline Trigonal Selenium Nanowires” Materials Chemistry and Physics (2007) vol. 101, No. 2-3, pp. 357-361.

(56) References Cited

OTHER PUBLICATIONS

An et al., "Large-Scale Synthesis of High Quality Trigonal Selenium Nanowires" European Journal of Inorganic Chemistry (2003) vol. 17, pp. 3250-3255.
Chen et al., "Selenium nanowires and nanotubes synthesized via a facile template-free solution method" Materials Research Bulletin (2010) vol. 45, pp. 699-704.
Dwivedi et al., "An Organic Acid-induced Synthesis and Characterization of Selenium Nanoparticles" Journal of Nanotechnology (2011) Article ID 651971, 6 pages.
Fan et al., "Hollow selenium encapsulated into 3D graphene hydrogels for lithium-selenium batteries with high rate performance and cycling stability" RSC Adv. (2017) vol. 7, pp. 21281-21286.
Gao et al., "Hollow Sphere Selenium Nanoparticles: Their In-Vitro Anti Hydroxyl Radical Effect" Advanced Materials (2002), vol. 14, No. 4, pp. 290-293.
Karlicky et al., "Halogenated Graphenes: Rapidly Growing Family of Graphene Derivatives" ACS Nano (2013) vol. 7, No. 8, pp. 6434-6464.
Li et al., "Mixed Surfactant Template Method for Preparation of Nanometer Selenium" E-Journal of Chemistry (2009) vol. 6, No. S1, pp. S304-S310.
Lin et al., "Observation in the Growth of Selenium Nanoparticles" Journal of Chinese Chemical Society (2004) vol. 51, No. 2, pp. 239-242.
Luesakul et al., "Shape-controlled synthesis of cubic-like selenium nanoparticles via the self-assembly method" Carbohydrate Polymers (2016) vol. 153, pp. 435-444.
Zeng et al., "Solvothermal synthesis of trigonal selenium with butterfly-like microstructure" Particuology (2013) vol. 11, No. 5, pp. 614-617.
Zhang et al., "Synthesis of selenium nanoparticles in the presence of polysaccharides" Materials Letters (2004) vol. 58, No. 21, pp. 2590-2594.
Habib et al., "Elastomeric Nanocomposite Based on Exfoliated Graphene Oxide and its Characteristics without Vulcanization" Hindawi Journal of Nanomaterials (2017) vol. 2017, Article ID 8543137, 11 pages.
Liu et al., "Solutions for the problems of silicon-carbon anode materials for lithium-ion batteries" Royal Society Open Science (2018) vol. 5, p. 172370.
PCT/US18/25135 International Search Report and Written Opinion dated Jun. 27, 2018, 14 pages.
PCT/US18/25150 International Search Report and Written Opinion dated Jun. 29, 2018, 14 pages.
PCT/US18/25163 International Search Report and Written Opinion dated Jul. 27, 2018, 19 pages.
PCT/US19/18931 International Search Report and Written Opinion dated May 8, 2019, 13 pages.
PCT/US19/19061 International Search Report and Written Opinion dated May 13, 2019, 11 pages.
PCT/US19/19062 International Search Report and Written Opinion dated May 13, 2019, 9 pages.
PCT/US19/20214 International Search Report and Written Opinion dated May 2, 2019, 7 pages.
PCT/US19/20222 International Search Report and Written Opinion dated May 3, 2019, 7 pages.
PCT/US19/21137 International Search Report and Written Opinion dated Jun. 18, 2019, 13 pages.
U.S. Appl. No. 15/901,367 Nonfinal Office Action dated Jun. 10, 2019, 12 pages.
Vaikhanski et al., "Fiber-reinforced composite foam from expandable PVC microspheres" Composites Part A (2003) vol. 34, pp. 1245-1253.
U.S. Appl. No. 15/434,632 Final Office Action dated Jan. 4, 2021, 20 pages.
U.S. Appl. No. 15/478,125 Final Office Action dated Sep. 3, 2020, 19 pages.
U.S. Appl. No. 15/903,788 Final Office Action dated Feb. 1, 2021, 9 pages.
U.S. Appl. No. 15/914,213 Nonfinal Office Action dated Aug. 31, 2020, 8 pages.
U.S. Appl. No. 15/954,088 Final Office Action dated Aug. 7, 2020, 8 pages.
U.S. Appl. No. 16/010,213 Final Office Action dated Jun. 15, 2018, 10 pages.
U.S. Appl. No. 16/010,213 Nonfinal Office Action dated Jan. 6, 2021, 10 pages.
U.S. Appl. No. 16/109,142 Nonfinal Office Action dated Oct. 13, 2020, 9 pages.
U.S. Appl. No. 16/109,178 Nonfinal Office Action dated Feb. 5, 2021, 11 pages.
U.S. Appl. No. 16/112,225 Final Office Action dated Oct. 1, 2020, 12 pages.
U.S. Appl. No. 16/113,676 Nonfinal Office Action dated Dec. 24, 2020, 12 pages.
U.S. Appl. No. 16/120,875 Nonfinal Office Action dated Dec. 30, 2020, 14 pages.
U.S. Appl. No. 16/123,218 Nonfinal Office Action dated Dec. 30, 2020, 11 pages.
U.S. Appl. No. 16/160,257 Final Office Action dated Oct. 14, 2020, 15 pages.
U.S. Appl. No. 16/166,536 Final Office Action dated Nov. 18, 2020, 7 pages.
U.S. Appl. No. 16/166,574 Nonfinal Office Action dated Dec. 30, 2020, 9 pages.
U.S. Appl. No. 16/238,052 Final Office Action dated Oct. 14, 2020, 15 pages.
U.S. Appl. No. 16/238,061 Nonfinal Office Action dated Aug. 14, 2020, 8 pages.
U.S. Appl. No. 16/256,321 Final Office Action dated Nov. 3, 2020, 8 pages.
U.S. Appl. No. 16/256,346 Final Office Action dated Dec. 8, 2020, 18 pages.
U.S. Appl. No. 16/014,623 Nonfinal Office Action dated Dec. 24, 2020, 11 pages.

ALKALI METAL-SELENIUM SECONDARY BATTERY CONTAINING A CATHODE OF ENCAPSULATED SELENIUM PARTICLES

FIELD OF THE INVENTION

The present invention is related to a unique cathode composition and cathode structure in a secondary or rechargeable alkali metal-selenium battery, including the lithium-selenium battery, sodium-selenium battery, and potassium-selenium battery, and a method of producing same.

BACKGROUND

Rechargeable lithium-ion (Li-ion) and lithium metal batteries (including Li-sulfur, Li-selenium, and Li metal-air batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal or metal-intercalated compound as an anode active material (except $Li_{4.4}Si$, which has a specific capacity of 4,200 mAh/g). Hence, in general, Li metal batteries have a significantly higher energy density than lithium ion batteries.

Historically, rechargeable lithium metal batteries were produced using non-lithiated compounds having relatively high specific capacities, such as $TiS_2$, $MoS_2$, $MnO_2$, $COO_2$, and $V_2O_5$, as the cathode active materials, which were coupled with a lithium metal anode. When the battery was discharged, lithium ions were transferred from the lithium metal anode through the electrolyte to the cathode, and the cathode became lithiated. Unfortunately, upon repeated charges/discharges, the lithium metal resulted in the formation of dendrites at the anode that ultimately grew to penetrate through the separator, causing internal shorting and explosion. As a result of a series of accidents associated with this problem, the production of these types of secondary batteries was stopped in the early 1990's, giving ways to lithium-ion batteries.

In lithium-ion batteries, pure lithium metal sheet or film was replaced by carbonaceous materials as the anode. The carbonaceous material absorbs lithium (through intercalation of lithium ions or atoms between graphene planes, for instance) and desorbs lithium ions during the re-charge and discharge phases, respectively, of the lithium ion battery operation. The carbonaceous material may comprise primarily graphite that can be intercalated with lithium and the resulting graphite intercalation compound may be expressed as $Li_xC_6$, where x is typically less than 1.

Although lithium-ion (Li-ion) batteries are promising energy storage devices for electric drive vehicles, state-of-the-art Li-ion batteries have yet to meet the cost and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range of 150-180 mAh/g. As a result, the specific energy of commercially available Li-ion cells is typically in the range of 120-240 Wh/kg, most. These specific energy values are two to three times lower than what would be required for battery-powered electric vehicles to be widely accepted.

With the rapid development of hybrid (HEV), plug-in hybrid electric vehicles (HEV), and all-battery electric vehicles (EV), there is an urgent need for anode and cathode materials that provide a rechargeable battery with a significantly higher specific energy, higher energy density, higher rate capability, long cycle life, and safety. Two of the most promising energy storage devices are the lithium-sulfur (Li—S) cell and lithium-selenium (Li—Se) cell since the theoretical capacity of Li is 3,861 mAh/g, that of S is 1,675 mAh/g, and that of Se is 675 mAh/g. Compared with conventional intercalation-based Li-ion batteries, Li—S and Li—Se cells have the opportunity to provide a significantly higher energy density (a product of capacity and voltage). Having a significantly higher electronic conductivity as compared to S, Se is a more effective cathode active material and, as such, Li—Se potentially can exhibit a higher rate capability.

However, Li—Se cell is still plagued with several major technical problems that have hindered its widespread commercialization:

(1) All prior art Li—Se cells have dendrite formation and related internal shorting issues;

(2) The cell tends to exhibit significant capacity decay during discharge-charge cycling. This is mainly due to the high solubility of selenium and lithium polyselenide anions formed as reaction intermediates during both discharge and charge processes in the polar organic solvents used in electrolytes. During cycling, the anions can migrate through the separator to the Li negative electrode whereupon they are reduced to solid precipitates and cannot return to the cathode, causing active mass loss. This phenomenon is commonly referred to as the Shuttle Effect. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

(3) Presumably, nanostructured mesoporous carbon materials could be used to hold the Se or lithium polyselenide in their pores, preventing large out-flux of these species from the porous carbon structure through the electrolyte into the anode. However, the fabrication of the proposed highly ordered mesoporous carbon structure requires a tedious and expensive template-assisted process. It is also challenging to load a large proportion of selenium into the mesoscaled pores of these materials using a physical vapor deposition or solution precipitation process. Typically the maximum loading of Se in these porous carbon structures is less than 50% by weight (i.e. the amount of active material is less than 50%; more than 50% being inactive materials).

Despite the various approaches proposed for the fabrication of high energy density Li—Se cells, there remains a need for cathode materials, production processes, and cell operation methods that retard the out-diffusion of Se or lithium polyselenide from the cathode compartments into other components in these cells, improve the utilization of electro-active cathode materials (Se utilization efficiency), and provide rechargeable Li—Se cells with high capacities over a large number of cycles.

Most significantly, lithium metal (including pure lithium, lithium alloys of high lithium content with other metal elements, or lithium-containing compounds with a high lithium content; e.g. >80% or preferably >90% by weight Li) still provides the highest anode specific capacity as compared to essentially all other anode active materials (except pure silicon, but silicon has pulverization issues). Lithium metal would be an ideal anode material in a lithium-selenium secondary battery if dendrite related issues could be addressed.

Sodium metal (Na) and potassium metal (K) have similar chemical characteristics to Li and the selenium cathode in sodium-selenium cells (Na—Se batteries) or potassium-selenium cells (K—Se) face the same issues observed in Li—S batteries, such as: (i) low active material utilization rate, (ii) poor cycle life, and (iii) low Coulumbic efficiency. Again, these drawbacks arise mainly from insulating nature of Se, dissolution of polyselenide intermediates in liquid electrolytes (and related Shuttle effect), and large volume change during repeated charges/discharges.

Hence, an object of the present invention is to provide a rechargeable Li—Se battery that exhibits an exceptionally high specific energy or high energy density. One particular technical goal of the present invention is to provide a Li metal-selenium or Li ion-selenium cell with a cell specific energy greater than 300 Wh/Kg, preferably greater than 350 Wh/Kg, and more preferably greater than 400 Wh/Kg (all based on the total cell weight).

It may be noted that in most of the open literature reports (scientific papers) and patent documents, scientists or inventors choose to express the cathode specific capacity based on the selenium or lithium polyselenide weight alone (not the total cathode composite weight), but unfortunately a large proportion of non-active materials (those not capable of storing lithium, such as conductive additive and binder) is typically used in their Li—Se cells. For practical use purposes, it is more meaningful to use the cathode composite weight-based capacity value.

A specific object of the present invention is to provide a rechargeable lithium-selenium or sodium-selenium cell based on rational materials and battery designs that overcome or significantly reduce the following issues commonly associated with conventional Li—Se and Na—Se cells: (a) dendrite formation (internal shorting); (b) low electric and ionic conductivities of selenium, requiring large proportion (typically 30-55%) of non-active conductive fillers and having significant proportion of non-accessible or non-reachable selenium, or lithium or sodium polyselenide); (c) dissolution of lithium polyselenide or sodium polyselenide in electrolyte and migration of dissolved lithium/sodium polyselenide from the cathode to the anode (which irreversibly react with lithium/sodium at the anode), resulting in active material loss and capacity decay (the shuttle effect); and (d) short cycle life.

SUMMARY OF THE INVENTION

The present invention provides an alkali metal-selenium cell (e.g. lithium-selenium cell, sodium-selenium cell, and potassium-selenium cell). The alkali metal-selenium cell comprises (a) an anode active material layer and an optional anode current collector supporting the anode active material layer; (b) a cathode active material layer and an optional cathode current collector supporting the cathode active material layer; and (c) an electrolyte with an optional porous separator layer in ionic contact with the anode active material layer and the cathode active material layer; wherein the cathode active material layer contains multiple particulates of a selenium-containing material selected from a selenium-carbon hybrid, selenium-graphite hybrid, selenium-graphene hybrid, conducting polymer-selenium hybrid, a metal sulfide, a Se alloy or mixture with Sn, Sb, Bi, S, or Te, a selenium compound, or a combination thereof and wherein at least one of the particulates is composed of one or a plurality of the selenium-containing material particles being embraced or encapsulated by a thin layer of an elastomer having a recoverable tensile strain no less than 5% (typically from 5% to 1000%) when measured without an additive or reinforcement, a lithium ion conductivity no less than $10^{-7}$ S/cm (typically from $10^{-5}$ S/cm to $5\times10^{-2}$ S/cm, measured at room temperature), and a thickness from 0.5 nm to 10 μm (typically from 1 nm to 1 μm, but preferably <100 nm and more preferably <10 nm).

The selenium-carbon hybrid, selenium-graphite hybrid, selenium-graphene hybrid, or conducting polymer-selenium hybrid may be a mixture, blend, composite, or chemically or physically bonded entity of selenium or sulfide with a carbon, graphite, graphene, or conducting polymer material. For instance, a selenium-graphene hybrid can be a simple mixture (in a particle form) of selenium and graphene prepared by ball-milling. Such a hybrid can contain selenium bonded on surfaces of a graphene oxide sheet, etc. As another example, the selenium-carbon hybrid can be a simple mixture (in a particle form) of selenium and carbon nanotubes, or can contain selenium residing in pores of activated carbon particles.

In some embodiments, the elastomer (also referred to as an elastomeric material) contains a material selected from natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

In the rechargeable alkali metal-selenium cell, the metal sulfide may contain a material denoted by $M_xSe_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. The metal element M preferably is selected from Li, Na, K, Mg, Zn, Cu, Ti, Ni, Co, Fe, or Al.

In some preferred embodiments, the metal sulfide in the cathode layer contains $Li_2Se_1$, $Li_2Se_2$, $Li_2Se_3$, $Li_2Se_4$, $Li_2Se_5$, $Li_2Se_6$, $Li_2Se_7$, $Li_2Se_8$, $Li_2Se_9$, $Li_2Se_{10}$, $Na_2Se_1$, $Na_2Se_2$, $Na_2Se_3$, $Na_2Se_4$, $Na_2Se_5$, $Na_2Se_6$, $Na_2Se_7$, $Na_2Se_8$, $Na_2Se_9$, $Na_2Se_{10}$, $K_2Se_1$, $K_2Se_2$, $K_2Se_3$, $K_2Se_4$, $K_2Se_5$, $K_2Se_6$, $K_2Se_7$, $K_2Se_8$, $K_2Se_9$, or $K_2Se_{10}$.

In the rechargeable alkali metal-selenium cell, the carbon or graphite material in the cathode active material layer may be selected from mesophase pitch, mesophase carbon, mesocarbon micro-bead (MCMB), coke particle, expanded graphite flake, artificial graphite particle, natural graphite particle, highly oriented pyrolytic graphite, soft carbon particle, hard carbon particle, carbon nanotube, carbon nanofiber, carbon fiber, graphite nanofiber, graphite fiber, carbonized polymer fiber, activated carbon, carbon black, or a combination thereof. The graphene may be selected from pristine graphene, graphene oxide, reduced graphene oxide (RGO), graphene fluoride, nitrogenated graphene, hydrogenated graphene, doped graphene, functionalized graphene, or a combination thereof.

The conducting polymer-selenium hybrid may preferably contain an intrinsically conductive polymer selected from polyaniline, polypyrrole, polythiophene, polyfuran, a bicyclic polymer, a sulfonated derivative thereof, or a combination thereof.

In certain embodiments, the elastomer contains from 0.1% to 50% by weight of a lithium ion-conducting additive dispersed therein, or contains therein from 0.1% by weight to 10% by weight of a reinforcement nanofilament selected from carbon nanotube, carbon nanofiber, graphene, or a combination thereof.

In certain embodiments, the elastomer is mixed with a lithium ion-conducting additive to form a composite wherein the lithium ion-conducting additive is dispersed in the elastomer and is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq 1$ and $1\leq y\leq 4$.

In certain embodiments, the elastomer is mixed with a lithium ion-conducting additive to form a composite wherein the lithium ion-conducting additive is dispersed in the elastomer and is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis (oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethysulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

In certain embodiments, the elastomer is mixed with a sodium ion-conducting additive to form a composite. The sodium-conducting additive may be selected from, for example, $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, or a combination thereof, wherein X=F, Cl, I, or Br, R=a hydrocarbon group, $0<x\leq 1$ and $1\leq y\leq 4$.

The sodium-conducting additive also may be selected from sodium perchlorate ($NaClO_4$), sodium hexafluorophosphate ($NaPF_6$), sodium borofluoride ($NaBF_4$), sodium hexafluoroarsenide ($NaAsF_6$), sodium trifluoro-metasulfonate ($NaCF_3SO_3$), bis-trifluoromethyl sulfonylimide sodium ($NaN(CF_3SO_2)_2$), sodium bis(oxalato)borate (NaBOB), sodium oxalyldifluoroborate ($NaBF_2C_2O_4$), sodium oxalyldifluoroborate ($NaBF_2C_2O_4$), sodium nitrate ($NaNO_3$), Na-fluoroalkyl-phosphates ($NaPF_3(CF_2CF_3)_3$), sodium bisperfluoro-ethysulfonylimide (NaBETI), sodium bis(trifluoromethanesulfonyl)imide, sodium bis(fluorosulfonyl)imide, sodium trifluoromethanesulfonimide (NaTFSI), an ionic liquid-based sodium salt, or a combination thereof.

In certain preferred embodiments, the elastomer is mixed with an electron-conducting polymer selected from polyaniline, polypyrrole, polythiophene, polyfuran, a bi-cyclic polymer, a sulfonated derivative thereof, or a combination thereof.

In certain embodiments, the elastomer forms a mixture or blend with a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, poly(vinylidene fluoride)-hexafluoropropylene (PVDF-HFP), a sulfonated derivative thereof, or a combination thereof.

Typically, the elastomer has a lithium ion conductivity or sodium ion conductivity from $1\times10^{-5}$ S/cm to $5\times10^{-2}$ S/cm at room temperature.

The rechargeable alkali metal-selenium cell has a selenium utilization efficiency from 80% to 99%, more typically from 85% to 97%.

In the rechargeable alkali metal-selenium cell, the electrolyte is selected from polymer electrolyte, polymer gel electrolyte, composite electrolyte, ionic liquid electrolyte, non-aqueous liquid electrolyte, soft matter phase electrolyte, solid-state electrolyte, or a combination thereof. The electrolyte may contain a salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$, lithium bis (oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates (LiPF3 $(CF_2CF_3)_3$), lithium bisperfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

The solvent may be selected from ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

In certain embodiments, the anode active material layer contains an anode active material selected from lithium metal, sodium metal, potassium metal, a lithium metal alloy, sodium metal alloy, potassium metal alloy, a lithium intercalation compound, a sodium intercalation compound, a potassium intercalation compound, a lithiated compound, a sodiated compound, a potassium-doped compound, lithiated titanium dioxide, lithium titanate, lithium manganate, a lithium transition metal oxide, $Li_4Ti_5O_{12}$, or a combination thereof.

The rechargeable alkali metal-selenium cell may be a lithium ion-selenium cell and, in this case, the anode active material layer contains an anode active material selected from the group consisting of: (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd), and lithiated versions thereof, (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof; and combinations thereof.

The rechargeable alkali metal-selenium cell may be a sodium ion-selenium cell or potassium ion-selenium cell and, in this case, the anode active material layer contains an anode active material selected from the group consisting of: (a) sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof, (b) sodium- or potassium-containing alloys or intermetallic compounds of Si, Ge, Sn, Pb, Sb, Bi, Zn, Al, Ti, Co, Ni, Mn, Cd, and their mixtures; (c) sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Sodium or potassium salts; (e) particles of graphite, hard carbon, soft carbon or carbon particles and pre-sodiated versions thereof; and combinations thereof.

Preferably, in the rechargeable alkali metal-selenium cell, the particulates contain from 80% to 99% by weight of selenium, metal selenide, or metal compound based on the total weight of the high-capacity polymer and the selenium, metal selenide, or metal compound combined.

The present invention also provides a cathode active material layer for a rechargeable alkali metal-selenium cell. This cathode active material layer contains multiple particulates of a selenium-containing material selected from a selenium-carbon hybrid, selenium-graphite hybrid, selenium-graphene hybrid, conducting polymer-selenium hybrid, a metal selenide, a Se alloy or mixture with Sn, Sb, Bi, S, or Te, a selenium compound, or a combination thereof and wherein at least one of said particulates is composed of one or a plurality of selenium-containing material particles being embraced or encapsulated by a thin layer of a elastomer having a recoverable tensile strain no less than 10% when measured without an additive or reinforcement, a lithium ion conductivity no less than $10^{-7}$ S/cm at room temperature (typically up to $5\times10^{-2}$ S/cm), and a thickness from 0.5 nm to 10 μm (preferably and typically from 1 nm to 1 μm, more preferably <100 nm).

In this product (a cathode layer), the selenium-carbon hybrid, selenium-graphite hybrid, selenium-graphene hybrid, or conducting polymer-selenium hybrid is a mixture, blend, composite, chemically or physically bonded entity of selenium or selenide with a carbon, graphite, graphene, or conducting polymer material.

In this cathode active material layer product, the elastomer preferably contains a material selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

In the cathode active material layer, the metal selenide may contain $M_xSe_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

The carbon or graphite material in the cathode active material layer may be selected from mesophase pitch, mesophase carbon, mesocarbon microbead (MCMB), coke particle, expanded graphite flake, artificial graphite particle, natural graphite particle, highly oriented pyrolytic graphite, soft carbon particle, hard carbon particle, carbon nanotube, carbon nanofiber, carbon fiber, graphite nanofiber, graphite fiber, carbonized polymer fiber, activated carbon, carbon black, or a combination thereof.

This cathode active material layer further comprises a binder resin that bonds the multiple particulates (of encapsulated selenium-containing particles) together to form the cathode active material layer, wherein the binder resin is not part of the multiple particulates (i.e. not included inside the core portion of a particulate) and is external to the multiple particulates. In other words, the elastomer does not embrace the binder resin.

In the alternative, the present invention also provides a cathode active material layer for a rechargeable alkali metal-selenium cell, wherein the cathode active material layer contains a resin binder, an optional conductive additive, and multiple particles of a selenium-containing material selected from a selenium-carbon hybrid, selenium-graphite hybrid, selenium-graphene hybrid, conducting polymer-selenium hybrid, a metal selenide, a Se alloy or mixture with Sn, Sb, Bi, S, or Te, a selenium compound, or a combination thereof, wherein the selenium-containing material particles are bonded by the resin binder to form an integral solid layer (a layer of adequate structural integrity so that it can be freely-standing), and wherein the integral solid layer is covered and protected by a thin layer of a elastomer having a recoverable tensile strain no less than 5% when measured without an additive or reinforcement, a lithium ion conductivity no less than $10^{-5}$ S/cm at room temperature, and a thickness from 0.5 nm to 10 μm. In some embodiments, the integral solid layer is bonded by the resin binder to a cathode current collector.

Such an elastomer protective layer can be formed by spraying the precursor mass (monomer or oligomer with the required initiator or curing agent) over a pre-made cathode active material layer and then polymerized and cross-linked.

The invention also provides a rechargeable alkali metal-selenium cell that contains such a cathode active material layer protected by an elastomer. This alkali metal-selenium cell comprises: (a) an anode active material layer and an optional anode current collector supporting the anode active material layer; (b) a cathode that contains this cathode active material layer; and (c) an electrolyte with an optional porous separator layer in ionic contact with the anode active material layer and the cathode active material layer.

The present invention also provides a powder mass product for use in a lithium-selenium battery cathode. The powder mass comprises multiple particulates of a selenium-containing material selected from a selenium-carbon hybrid, selenium-graphite hybrid, selenium-graphene hybrid, conducting polymer-selenium hybrid, a metal selenide, a Se alloy or mixture with Sn, Sb, Bi, S, or Te, a selenium compound, or a combination thereof and wherein at least one of the particulates comprises one or a plurality of selenium-containing material particles being embraced or encapsulated by a thin layer of a elastomer having a recoverable tensile strain no less than 5% when measured without an additive or reinforcement, a lithium ion conductivity no less than $10^{-7}$ S/cm at room temperature, and a thickness from 0.5 nm to 10 μm.

In the powder mass, the selenium-carbon hybrid, selenium-graphite hybrid, selenium-graphene hybrid, or conducting polymer-selenium hybrid is a mixture, blend, composite, chemically or physically bonded entity of selenium or selenide with a carbon, graphite, graphene, or conducting polymer material. The elastomer contains a material selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

In the powder mass, the metal selenide preferably contains $M_xSe_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

The invention also provides a method of manufacturing a powder mass for a lithium-selenium battery cathode, the method comprising (a) dispersing particles of a selenium-containing material in an elastomer solution to form a slurry, wherein the selenium-containing material is selected from a selenium-carbon hybrid, selenium-graphite hybrid, selenium-graphene hybrid, conducting polymer-selenium hybrid, metal selenide, a Se alloy or mixture with Sn, Sb, Bi, S, or Te, a selenium compound, or a combination thereof; and (b) dispensing and forming the slurry into said powder mass comprising multiple particulates of the selenium-containing material wherein at least one of the particulates comprises one or a plurality of selenium-containing material particles being embraced or encapsulated by a thin layer of an elastomer having a recoverable tensile strain no less than 5% when measured without an additive or reinforcement, a lithium ion conductivity no less than $10^{-7}$ S/cm at room temperature, and a thickness from 0.5 nm to 10 μm.

Preferably, the step of dispensing and forming comprises a procedure selected from pan coating, air suspension, centrifugal extrusion, vibrational nozzle, spray-drying, ultrasonic spraying, coacervation-phase separation, interfacial polycondensation, in-situ polymerization, matrix polymerization, or a combination thereof. The elastomer solution may contain a precursor monomer or oligomer to an elastomer or an uncured polymer dissolved in a liquid solvent (e.g. water or organic solvent). The step of dispensing and forming can include a procedure of removing (drying) the liquid solvent, polymerizing the monomer or oligomer, and/or curing/cross-linking the polymer.

The present invention also provides a method of manufacturing a rechargeable alkali metal-selenium cell. The method comprises: (a) providing a cathode and an optional cathode current collector to support the cathode; (b) providing an alkali metal anode, selected from Li, Na, K, or a combination thereof and an optional anode current collector to support the anode; (c) combining the anode and the cathode and adding an electrolyte in contact with the anode and the cathode to form the alkali metal-selenium cell; wherein the cathode contains multiple particulates of a selenium-containing material wherein at least one of the particulates is composed of one or a plurality of selenium-containing material particles which are embraced or encapsulated by a thin layer of a elastomer having a recoverable tensile strain from 5% to 700% when measured without an additive or reinforcement (more typically from 10% to 300%), a lithium ion conductivity no less than $10^{-7}$ S/cm (typically from $1\times10^{-5}$ S/cm to $5\times10^{-2}$ S/cm) at room temperature, and a thickness from 0.5 nm to 10 μm (preferably from 1 nm to 1 μm, more preferably from 1 nm to 100 nm, and most preferably, from 1 nm to 10 nm). A separator may be added to electrically separate the anode and the cathode if the electrolyte is not a solid electrolyte.

In the above manufacturing method, the selenium-containing material preferably is selected from a selenium-carbon hybrid, selenium-graphite hybrid, selenium-graphene hybrid, conducting polymer-selenium hybrid, a metal selenide, a Se alloy or mixture with Sn, Sb, Bi, S, or Te, a selenium compound, or a combination thereof. The selenium-carbon hybrid, selenium-graphite hybrid, selenium-graphene hybrid, or conducting polymer-selenium hybrid is a mixture, blend, composite, chemically or physically bonded entity of selenium or selenide with a carbon, graphite, graphene, or conducting polymer material In the invented manufacturing method, the elastomer preferably contains a material selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

In the manufacturing method, the operation of providing multiple particulates may include encapsulating or embracing the one or a plurality of selenium-containing material particles with a thin layer of elastomer using a procedure selected from pan coating, air suspension, centrifugal extrusion, vibrational nozzle, spray-drying, ultrasonic spraying, coacervation-phase separation, interfacial polycondensation, in-situ polymerization, matrix polymerization, or a combination thereof.

In some embodiments, the operation of providing multiple particulates includes encapsulating or embracing said one or a plurality of selenium-containing material particles with a mixture of said elastomer with an elastomer, an electronically conductive polymer, a lithium-ion conducting material, a sodium ion conducting additive, a reinforcement material, or a combination thereof. Preferably, the lithium ion-conducting material is dispersed in said elastomer and is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$ and $1\leq y\leq4$.

In certain embodiments, the lithium ion-conducting material is dispersed in said elastomer and is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoroethysulfonylimide (LiBETI), lithium bis(trifluoromethanesulfonyl)imide, lithium bis(fluorosulfonyl) imide, lithium trifluoromethanesulfonimide (LiTFSI), an ionic liquid-based lithium salt, or a combination thereof.

In the instant Li—Se cell, the reversible specific capacity of the selenium cathode is typically and preferably no less than 500 mAh per gram and often exceeds 600 or even 625 mAh per gram of entire cathode layer. The high specific capacity of the presently invented cathode, when combined with a lithium anode, typically leads to a cell specific energy significantly greater than 350 Wh/Kg, based on the total cell weight including anode, cathode, electrolyte, separator, and current collector weights combined. This specific energy value is not based on the cathode active material weight or cathode layer weight only (as sometimes did in open literature or patent applications); instead, this is based on entire cell weight. In many cases, the cell specific energy is higher than 400 Wh/Kg and, in some examples, exceeds 450 Wh/kg.

These and other advantages and features of the present invention will become more transparent with the description of the following best mode practice and illustrative examples.

DETAILED DESCRIPTION OF PREFERRED EMBODIMENTS

Figure 1A:
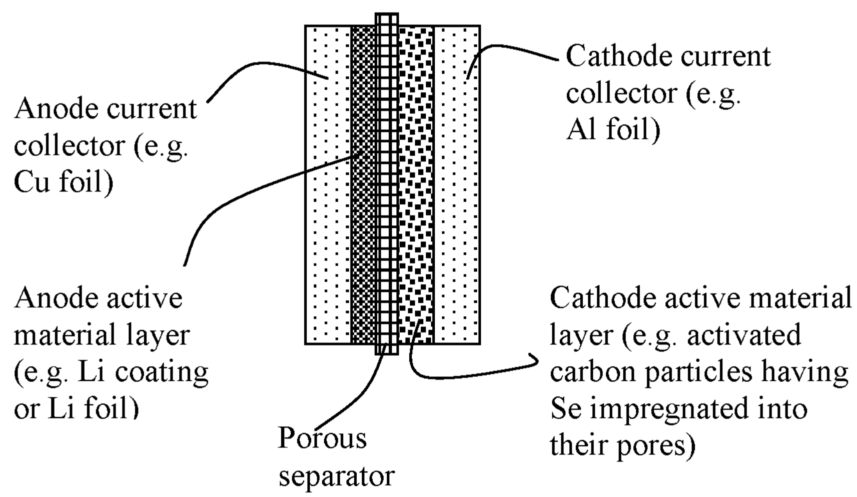
FIG. 1(A) Schematic of a prior art lithium or sodium metal-selenium battery cell, wherein the anode layer is a thin coating or foil of an anode active material (Li or Na metal) and the cathode is composed of particles of a cathode active material, a conductive additive (not shown) and a resin binder (not shown).

For convenience, the following discussion of preferred embodiments is primarily based on Li—Se cells, but the same or similar composition, structure, and methods are applicable to Na—Se and K—Se cells. Examples are presented for Li—Se cells, Na—Se cells, and K—Se cells.

A. Alkali Metal-Selenium Cells (Using Lithium-Selenium Cells as an Example)

The specific capacity and specific energy of a Li—Se cell (or Na—Se, or K—Se cell) are dictated by the actual amount of selenium that can be implemented in the cathode active layer (relative to other non-active ingredients, such as the binder resin and conductive filler) and the utilization rate of this selenium amount (i.e. the utilization efficiency of the cathode active material or the actual proportion of Se that actively participates in storing and releasing lithium ions). Using Li—Se cell as an illustrative example, a high-capacity and high-energy Li—Se cell requires a high amount of Se in the cathode active layer (i.e. relative to the amounts of non-active materials, such as the binder resin, conductive additive, and other modifying or supporting materials) and a high Se utilization efficiency). The present invention provides such a cathode active layer, its constituent powder mass product, the resulting Li—Se cell, and a method of producing such a cathode active layer and battery.

The alkali metal-selenium cell comprises (a) an anode active material layer and an optional anode current collector supporting the anode active material layer; (b) a cathode active material layer and an optional cathode current collector supporting the cathode active material layer; and (c) an electrolyte with an optional porous separator layer in ionic contact with the anode active material layer and the cathode active material layer; wherein the cathode active material layer contains multiple particulates of a selenium-containing material selected from a selenium-carbon hybrid, selenium-graphite hybrid, selenium-graphene hybrid, conducting polymer-selenium hybrid, a metal selenide, a Se alloy or mixture with Sn, Sb, Bi, S, or Te, a selenium compound, or a combination thereof and wherein at least one of the particulates is composed of one or a plurality of the selenium-containing material particles being embraced or encapsulated by a thin layer of a elastomer having a recoverable tensile strain no less than 10% when measured without an additive or reinforcement, a lithium ion conductivity or sodium ion conductivity no less than $10^{-7}$ S/cm (typically from $10^{-5}$ S/cm to $5\times10^{-2}$ S/cm, measured at room temperature), and a thickness from 0.5 nm to 10 μm (typically from 1 nm to 1 μm, but preferably <100 nm and more preferably <10 nm).

The selenium-carbon hybrid, selenium-graphite hybrid, selenium-graphene hybrid, or conducting polymer-selenium hybrid may be a mixture, blend, composite, or chemically or physically bonded entity of selenium or selenide with a carbon, graphite, graphene, or conducting polymer material. For instance, a selenium-graphene hybrid can be a simple mixture (in a particle form) of selenium and graphene prepared by ball-milling. Such a hybrid can contain selenium bonded on surfaces of a graphene oxide sheet, etc. As another example, the selenium-carbon hybrid can be a simple mixture (in a particle form) of selenium and carbon nanotubes, or can contain selenium residing in pores of activated carbon particles.

In the invented rechargeable alkali metal-selenium cell, the elastomer may contain a cross-linked network of polymer chains having an ether linkage, nitrile-derived linkage, benzo peroxide-derived linkage, ethylene oxide linkage, propylene oxide linkage, vinyl alcohol linkage, cyano-resin linkage, triacrylate monomer-derived linkage, tetraacrylate monomer-derived linkage, or a combination thereof in said cross-linked network of polymer chains. In some preferred embodiments, the elastomer contains a cross-linked network of polymer chains selected from nitrile-containing polyvinyl alcohol chains, cyanoresin chains, pentaerythritol tetraacrylate chains, pentaerythritol triacrylate chains, ethoxylated trimethylolpropane triacrylate (ETPTA) chains, ethylene glycol methyl ether acrylate (EGMEA) chains, or a combination thereof.

In the rechargeable alkali metal-selenium cell, the metal selenide may contain a material denoted by $M_xSe_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. The metal element M preferably is selected from Li, Na, K, Mg, Zn, Cu, Ti, Ni, Co, Fe, or Al. In some preferred embodiments, the metal selenide in the cathode layer contains $Li_2Se_1$, $Li_2Se_2$, $Li_2Se_3$, $Li_2Se_4$, $Li_2Se_5$, $Li_2Se_6$, $Li_2Se_7$, $Li_2Se_8$, $Li_2Se_9$, $Li_2Se_{10}$, $Na_2Se_1$, $Na_2Se_2$, $Na_2Se_3$, $Na_2Se_4$, $Na_2Se_5$, $Na_2Se_6$, $Na_2Se_7$, $Na_2Se_8$, $Na_2Se_9$, $Na_2Se_{10}$, $K_2Se_1$, $K_2Se_2$, $K_2Se_3$, $K_2Se_4$, $K_2Se_5$, $K_2Se_6$, $K_2Se_7$, $K_2Se_8$, $K_2Se_9$, or $K_2Se_{10}$.

In the rechargeable alkali metal-selenium cell, the carbon or graphite material in the cathode active material layer may be selected from mesophase pitch, mesophase carbon, mesocarbon micro-bead (MCMB), coke particle, expanded graphite flake, artificial graphite particle, natural graphite particle, highly oriented pyrolytic graphite, soft carbon particle, hard carbon particle, carbon nanotube, carbon nanofiber, carbon fiber, graphite nanofiber, graphite fiber, carbonized polymer fiber, activated carbon, carbon black, or a combination thereof. The graphene may be selected from pristine graphene, graphene oxide, reduced graphene oxide (RGO), graphene fluoride, nitrogenated graphene, hydrogenated graphene, doped graphene, functionalized graphene, or a combination thereof.

The conducting polymer-selenium hybrid may preferably contain an intrinsically conductive polymer selected from polyaniline, polypyrrole, polythiophene, polyfuran, a bicyclic polymer, a sulfonated derivative thereof, or a combination thereof. This can be a simple mixture of selenium or metal selenide with a conducting polymer.

In certain embodiments, the elastomer contains from 0.1% to 50% by weight of a lithium ion-conducting additive dispersed therein, or contains therein from 0.1% by weight to 10% by weight of a reinforcement nanofilament selected from carbon nanotube, carbon nanofiber, graphene, or a combination thereof. The lithium ion-conducting additive to form a composite wherein said lithium ion-conducting additive is dispersed in said elastomer and is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$ and $1\leq y\leq4$.

The lithium ion-conducting additive may be dispersed in the elastomer and may be selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis (oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethysulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

Elastomer refers to a polymer, typically a lightly cross-linked polymer, which exhibits an elastic deformation that is at least 5% when measured (without an additive or reinforcement in the polymer) under uniaxial tension. In the field of materials science and engineering, the "elastic deformation" is defined as a deformation of a material (when being mechanically stressed) that is essentially fully recoverable and the recovery is essentially instantaneous upon release of the load. The elastic deformation is preferably greater than 10%, more preferably greater than 50%, further more preferably greater than 100%, still more preferably greater than 150%, and most preferably greater than 200%. The preferred types of high-capacity polymers will be discussed later.

Figure 4:
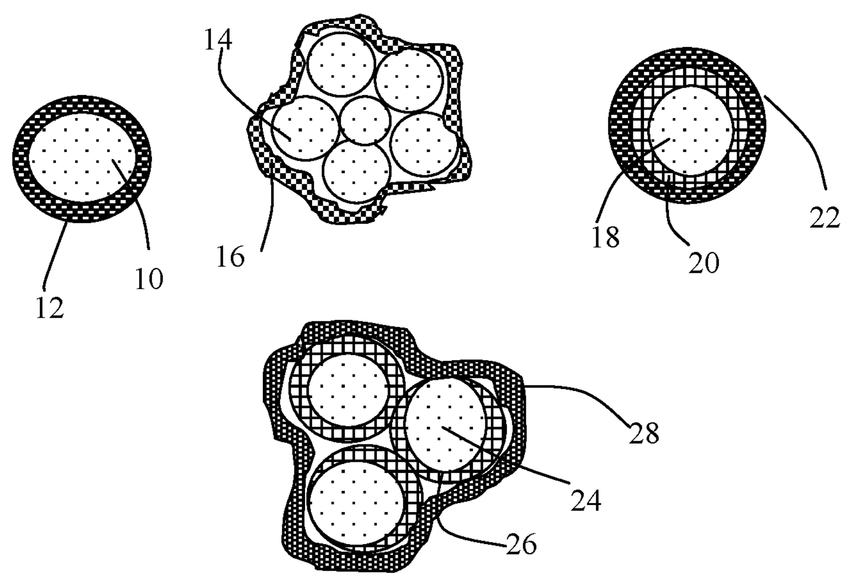
FIG. 4 Several different types of particulates containing elastomer-encapsulated cathode active material particles (e.g. particles of Se, lithium polyselenide, sodium polyselenide, potassium polyselenide, a Se alloy or mixture with Sn, Sb, Bi, S, or Te, or a combination thereof).

As illustrated in FIG. 4, the present invention provides four major types of particulates of high-capacity polymer-encapsulated cathode active material particles. The first one is a single-particle particulate containing a cathode active material core 10 (e.g. particle of a selenium-CNT mixture) encapsulated by a high-capacity polymer shell 12. The second is a multiple-particle particulate containing multiple cathode active material particles 14 (e.g. particles of selenium-graphene mixture, selenium-carbon black mixture, activated carbon particles having pores impregnated with S, lithium polyselenide particles, etc.), optionally along with other active materials (e.g. particles of graphite or hard carbon, not shown) or conductive additive, which are encapsulated by a high-capacity polymer 16. The third is a single-particle particulate containing a cathode active material core 18 coated by a carbon or graphene layer 20 (or other conductive material) and further encapsulated by a elastomer 22. The fourth is a multiple-particle particulate containing multiple cathode active material particles 24 coated with a conductive protection layer 26 (carbon, graphene, etc.), optionally along with other active materials (e.g. particles of graphite or hard carbon, not shown) or conductive additive, which are encapsulated by a elastomer shell 28. These cathode active material particles can be based on selenium compound, metal polyselenide, etc., instead of neat selenium.

Figure 3:
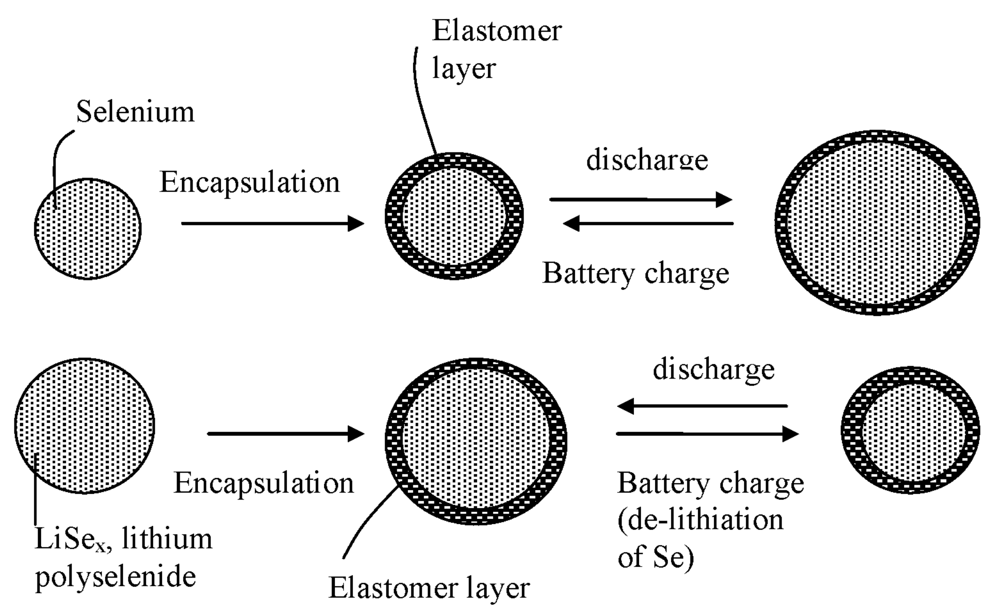
FIG. 3 Schematic of the presently invented elastomer-encapsulated cathode active material particles (e.g. Se or $Li_2Se$ particles). The high elasticity of the elastomer shell enables the shell to expand and contract congruently and conformingly with the core particle.

As schematically illustrated in the upper portion of FIG. 3, a selenium-based particle can be encapsulated by a high-capacity polymer shell to form a core-shell structure (selenium core and polymer shell in this example). As the lithium-selenium battery is discharged, the cathode active material (e.g. selenium in the high-capacity polymer-encapsulated Se/CNT particle) reacts with lithium ions to form lithium polyselenide which expands in volume. Due to the high elasticity of the encapsulating shell (the high-capacity polymer), the shell will not be broken into segments (in contrast to the broken carbon shell). The high-capacity polymer shell remains intact, preventing the exposure of the underlying lithium selenide to electrolyte and, thus, preventing the lithium selenide from dissolving in the electrolyte during repeated charges/discharges of the battery. This strategy prevents continued migration of lithium polyselenide to the anode side which reacts with lithium and is unable to return to the cathode (the shuttle effect). This shuttle effect is mainly responsible for continued capacity decay in a conventional Li—Se, Na—Se, or K—Se cell.

Alternatively, referring to the lower portion of FIG. 3, lithium selenide is used as the cathode active material. A layer of high-capacity polymer may be encapsulated around the lithium polyselenide particle to form a core-shell structure. When the Li—Se battery is charged and lithium ions are released from the cathode, the cathode active material particle contracts. However, the high-capacity polymer is capable of elastically shrinking in a conformal manner; hence, leaving behind no gap between the protective shell and the selenium. Such a configuration is amenable to subsequent lithium reaction with selenium. The high-capacity polymer shell expands and shrinks congruently with the expansion and shrinkage of the encapsulated core cathode active material particle, enabling long-term cycling stability of a lithium battery.

Production of Se particles, from nanometer to micron scales, is well known in the art and fine Se powders are commercially available. Micron-scaled Se particles are easily produced using ball-milling if the initial powder size is too big. Due to the low melting point (221° C.) of Se, one can easily obtain Se melt and use a melt atomization technique to produce sub-micron Se particles, for instance. Various methods have been used in the past for synthesizing Se nanoparticle (SeNP), such as chemical reduction method, biological synthesis, solvothermal route, hydrothermal route, microwave assisted synthesis, green synthesis, electrodeposition method, and pulsed laser ablation method. The following references may be consulted for the details of several methods of producing SeNP:

1. Sheng-Yi Zhang, Juan Zhang, Hong-Yan Wang, Hong-Yuan Chen, "Synthesis of selenium nanoparticles in the presence of polysaccharides," Materials Letters, Volume 58, Issue 21, August 2004, Pages 2590-2594
2. Urarika Luesakul, Seamkwan Komenek, Songchan Puthong, Nongnuj Muangsin, "Shape-controlled synthesis of cubic-like selenium nanoparticles via the self-assembly method," Carbohydrate Polymers, Volume 153, 20 Nov. 2016, Pages 435-444.
3. C. Dwivedi, et al., "An Organic Acid-Induced Synthesis and Characterization of Selenium Nanoparticles," Journal of Nanotechnology, 2011: 1-6.
4. Lin, Z., Lin, F. and Wang, C. R. C. "Observation in the Growth of Selenium Nanoparticles," *Journal of Chinese Chemical Society,* 2004, 51 (2): 239-242.
5. Gao, B. X., Zhang, J. and Zhang, L., "Hollow Sphere Selenium Nanoparticles: Their In-Vitro Anti Hydroxyl Radical Effect," *Advanced Materials,* 14 (4), (2002) 290-293.
6. Li, Z. and Hua, P. 2009. "Mixed Surfactant Template Method for Preparation of Nanometer Selenium," *E-Journal of Chemistry* 6 (1) (2009) 304-310.
7. Chen, H., Shin, D., Nam, J., Kwon, K. and Yoo, J. 2010. "Selenium Nanowiresand Nanotubes Synthesized via a Facile Template-Free Solution Method," *Materials Research Bulletin* 45 (6) (2010) 699-704.)
8. Zeng, K., Chen, S., Song, Y., Li, H., Li, F. and Liu, P. 2013, "Solvothermal Synthesis of Trigonal Selenium with Butterfly-like Microstructure," *Particuology,* 11 (5) (2013) 614-617.)
9. An, C. and Wang, S. 2007. "Diameter-Selected Synthesis of Single Crystalline Trigonal Selenium Nanowires.|*Materials Chemistry and Physics,* 2007, 101 (2-3): 357-361.
10. An, C., Tang, K., Liu, X. and Qian, Y., "Large-Scale Synthesis of High Quality Trigonal Selenium Nanowires.|*European Journal of Inorganic Chemistry,"* 2003 (17): 3250-3255.

For instance, the chemical reduction method employs reduction of selenium salt using variety of reducing agents such as surfactants and biocompatible chemicals to obtain stabilized colloidal suspensions of nanoparticles. Various shapes and sizes of SeNP are synthesized using these methods. Chemical reduction method assists in maintaining better uniformity of the particles.

Dwivedi et al. [Ref. 3] used carboxylic acids like acetic acid, oxalic acid and aromatic acid (gallic acid) to synthesize SeNP of spherical shape and size 40-100 nm using sodium selenosulfate as the source of selenium. Lin et al. [Ref. 4] used sulfur dioxide and SDS as reducing agents and selenous acid was used as a precursor to synthesize SeNP with a size range of 30-200 nm. Gao et al. [Ref. 5] used β-mercaptoethanol as a reducing agent producing hollow sphere SeNP (HSSN) of size 32 nm.

A mixed surfactant synthesis carried out by Li and Hua [Ref. 6] showed the use of dihydroascorbic acid with sodium dodecyl sulfate and polyvinyl chloride to prepare SeNP of size 30 nm. A study reported by Chen et al. [Ref. 7] used template free solution to prepare trigonal Nanowires and Nanotubes of 70-100 nm width and 180-350 nm respectively wherein, glucose was selected as a reducing agent and sodium selenite as the selenium source forming α-Se. Recrystallization of these SeNP without template or a surfactant resulted in the transformation of α-Se to t-Se.

The solvothermal or hydrothermal method employs usage of a solvent under high pressure and temperature that involves the interaction of precursors during synthesis. For instance, Zeng et al. [Ref. 8] synthesized nanoparticles using this method wherein, selenium was dissolved in ethylenediamine and kept in a Teflon coated autoclave maintaining the temperature at 160° C. for 2 hour and then cooled to RT to form a brown homogenous solution and then acetone stored at −18° C. was added to this solution to make it amorphous SeNP and further transforming it into trigonal selenium of hexagonal rod shaped structure. These particles on aging acquired a butterfly-like microstructure having 4 μm in width and 8 μm in length.

A study conducted by An & Wang [Ref. 9 and 10] showed synthesis of trigonal selenium Nanowires of 10-60 nm in size using sodium selenite and thiosulphate salts as starting materials. Steam under pressure was used for the synthesis with a set temperature of 180° C.

Once the particles of Se are produced, they can be incorporated into a polymer-liquid medium suspension to make a polymer mixture suspension, dispersion or slurry. This suspension, dispersion, or slurry is then subjected to secondary particle formation treatment, such as spray-drying, spray-pyrolysis, ultrasonic spraying, and vibration-nozzle droplet formation, to make the invented polymer-protected particulates.

B. Elastomers

Preferably and typically, the elastomer has a lithium ion conductivity no less than $10^{-7}$ S/cm, more preferably no less than $10^{-4}$ S/cm, further preferably no less than $10^{-3}$ S/cm, and most preferably no less than $10^{-2}$ S/cm. In some embodiments, the elastomer is a neat polymer having no additive or filler dispersed therein. In others, the elastomer is an elastomer matrix composite containing from 0.1% to 50% (preferably 1% to 35%) by weight of a lithium ion-conducting additive dispersed in an elastomer matrix material. The elastomer must have a high elasticity (elastic deformation strain value >5%). An elastic deformation is a deformation that is fully recoverable and the recovery process is essentially instantaneous (no significant time delay). The elastomer can exhibit an elastic deformation from 5% up to 1,000% (10 times of its original length), more typically from 10% to 800%, and further more typically from 30% to 300%, and most typically and desirably from 70% to 300%. It may be noted that although a metal typically has a high ductility (i.e. can be extended to a large extent without breakage), the majority of the deformation is plastic deformation (non-recoverable, permanent deformation) and only a small amount of elastic deformation (typically <1% and more typically <0.2%).

In some preferred embodiments, the elastomer contains a material selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

Typically, an elastomer is originally in a monomer or oligomer states that can be cured to form a cross-linked polymer that is highly elastic. Prior to curing, these polymers or oligomers are soluble in an organic solvent to form a polymer solution. Particles of a cathode active material (e.g. selenium-carbon hybrid particles, selenium-graphite hybrid particles, selenium-graphene hybrid particles, selenium compound particles, metal selenide particles, etc.) can be dispersed in this polymer solution to form a suspension (dispersion or slurry) of an active material particle-polymer (monomer or oligomer) mixture. This suspension can then be subjected to a solvent removal treatment while individual particles remain substantially separated from one another. The polymer (or monomer or oligomer) precipitates out to deposit on surfaces of these active material particles. This can be accomplished, for instance, via spray drying, ultrasonic spraying, air-assisted spraying, aerosolization, and other secondary particle formation procedures.

It is essential for these materials to form a lightly cross-linked network of polymer chains. In other words, the network polymer or cross-linked polymer should have a relatively low degree of cross-linking or low cross-link density to impart a high elastic deformation.

The cross-link density of a cross-linked network of polymer chains may be defined as the inverse of the molecular weight between cross-links (Mc). The cross-link density can be determined by the equation, $Mc=\rho RT/Ge$, where Ge is the equilibrium modulus as determined by a temperature sweep in dynamic mechanical analysis, p is the physical density, R is the universal gas constant in J/mol*K and T is absolute temperature in K. Once Ge and ρ are determined experimentally, then Mc and the cross-link density can be calculated.

The magnitude of Mc may be normalized by dividing the Mc value by the molecular weight of the characteristic repeat unit in the cross-link chain or chain linkage to obtain a number, Nc, which is the number of repeating units between two cross-link points. We have found that the elastic deformation strain correlates very well with Mc and Nc. The elasticity of a cross-linked polymer derives from a large number of repeating units (large Nc) between cross-links. The repeating units can assume a more relax conformation (e.g. random coil) when the polymer is not stressed. However, when the polymer is mechanically stressed, the linkage chain uncoils or gets stretched to provide a large deformation. A long chain linkage between cross-link points (larger Nc) enables a larger elastic deformation. Upon release of the load, the linkage chain returns to the more relaxed or coiled state. During mechanical loading of a polymer, the cross-links prevent slippage of chains that otherwise form plastic deformation (non-recoverable).

Preferably, the Nc value in a elastomer is greater than 5, more preferably greater than 10, further more preferably greater than 100, and even more preferably greater than 200. These Nc values can be readily controlled and varied to achieve different elastic deformation values by using different cross-linking agents with different functionalities, and by designing the polymerization and cross-linking reactions to proceed at different temperatures for different periods of time.

Alternatively, Mooney-Rilvin method may be used to determine the degree of cross-linking. Crosslinking also can be measured by swelling experiments. In a swelling experiment, the crosslinked sample is placed into a good solvent for the corresponding linear polymer at a specific temperature, and either the change in mass or the change in volume is measured. The higher the degree of crosslinking, the less swelling is attainable. Based on the degree of swelling, the Flory Interaction Parameter (which relates the solvent interaction with the sample, Flory Huggins Eq.), and the density of the solvent, the theoretical degree of crosslinking can be calculated according to Flory's Network Theory. The Flory-Rehner Equation can be useful in the determination of cross-linking. The elastomer for encapsulation may contain a simultaneous interpenetrating network (SIN) polymer, wherein two cross-linking chains intertwine with each other, or a semi-interpenetrating network polymer (semi-IPN), which contains a cross-linked polymer and a linear polymer.

The elastomer may form a mixture or blend with an electron-conducting polymer selected from polyaniline, polypyrrole, polythiophene, polyfuran, a bi-cyclic polymer, derivatives thereof (e.g. sulfonated versions), or a combination thereof.

In some embodiments, the elastomer may form a mixture with a lithium ion-conducting polymer selected from poly (ethylene oxide) (PEO), polypropylene oxide (PPO), poly (acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, poly(vinylidene fluoride)-hexafluoropropylene (PVDF-HFP), a derivative thereof (e.g. sulfonated versions), or a combination thereof.

Some elastomers are saturated rubbers that cannot be cured by sulfur vulcanization; they are made into a rubbery or elastomeric material via different means: e.g. by having a copolymer domain that holds other linear chains together. Each of these elastomers can be used to encapsulate particles of an anode active material by one of several means: melt mixing (followed by pelletizing and ball-milling, for instance), solution mixing (dissolving the anode active material particles in an uncured polymer, monomer, or oligomer, with or without an organic solvent) followed by drying (e.g. spray drying), interfacial polymerization, or in situ polymerization of elastomer in the presence of anode active material particles.

Saturated rubbers and related elastomers in this category include EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, and protein elastin. Polyurethane and its copolymers (e.g. urea-urethane copolymer) are particularly useful elastomeric shell materials for encapsulating active material particles.

C. Encapsulation of Cathode Active Material Particles by an Elastomer

Several micro-encapsulation processes require the elastomer or its precursor (monomer or oligomer) to be dissolvable in a solvent. Fortunately, all the elastomers or their precursors used herein are soluble in some common solvents. The un-cured polymer or its precursor can be readily dissolved in a common organic solvent to form a solution. This solution can then be used to encapsulate solid particles via several of the micro-encapsulation methods to be discussed in what follows. Upon encapsulation, the polymer shell is then polymerized and cross-linked.

There are three broad categories of micro-encapsulation methods that can be implemented to produce elastomer-encapsulated particles of a cathode active material: physical methods, physico-chemical methods, and chemical methods. The physical methods include pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization.

Pan-coating method: The pan coating process involves tumbling the active material particles in a pan or a similar device while the encapsulating material (e.g. monomer/oligomer, polymer melt, polymer/solvent solution) is applied slowly until a desired encapsulating shell thickness is attained.

Air-suspension coating method: In the air suspension coating process, the solid particles (core material) are dispersed into the supporting air stream in an encapsulating chamber. A controlled stream of a polymer-solvent solution (polymer or its monomer or oligomer dissolved in a solvent; or its monomer or oligomer alone in a liquid state) is concurrently introduced into this chamber, allowing the solution to hit and coat the suspended particles. These suspended particles are encapsulated (fully coated) with a polymer or its precursor molecules while the volatile solvent is removed, leaving a very thin layer of polymer (or its precursor, which is cured/hardened subsequently) on surfaces of these particles. This process may be repeated several times until the required parameters, such as full-coating thickness (i.e. encapsulating shell or wall thickness), are achieved. The air stream which supports the particles also helps to dry them, and the rate of drying is directly proportional to the temperature of the air stream, which can be adjusted for optimized shell thickness.

In a preferred mode, the particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating shell thickness is achieved.

Centrifugal extrusion: Active material particles may be encapsulated using a rotating extrusion head containing concentric nozzles. In this process, a stream of core fluid (slurry containing particles of a material dispersed in a solvent) is surrounded by a sheath of shell solution or melt. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational nozzle method: Core-shell encapsulation or matrix-encapsulation of an active material can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the active material. The solidification can be done according to the used gelation system with an internal gelation (e.g. sol-gel processing, melt) or an external (additional binder system, e.g. in a slurry).

Spray-drying: Spray drying may be used to encapsulate particles of an active material when the active material is dissolved or suspended in a melt or polymer solution. In spray drying, the liquid feed (solution or suspension) is atomized to form droplets which, upon contacts with hot gas, allow solvent to get vaporized and thin polymer shell to fully embrace the solid particles of the active material.

Coacervation-phase separation: This process consists of three steps carried out under continuous agitation:

(a) Formation of three immiscible chemical phases: liquid manufacturing vehicle phase, core material phase and encapsulation material phase. The core material is dispersed in a solution of the encapsulating polymer (or its monomer or oligomer). The encapsulating material phase, which is an immiscible polymer in liquid state, is formed by (i) changing temperature in polymer solution, (ii)

addition of salt, (iii) addition of non-solvent, or (iv) addition of an incompatible polymer in the polymer solution.

(b) Deposition of encapsulation shell material: core material being dispersed in the encapsulating polymer solution, encapsulating polymer material coated around core particles, and deposition of liquid polymer embracing around core particles by polymer adsorbed at the interface formed between core material and vehicle phase; and (c) Hardening of encapsulating shell material: shell material being immiscible in vehicle phase and made rigid via thermal, cross-linking, or dissolution techniques.

Interfacial polycondensation and interfacial cross-linking: Interfacial polycondensation entails introducing the two reactants to meet at the interface where they react with each other. This is based on the concept of the Schotten-Baumann reaction between an acid chloride and a compound containing an active hydrogen atom (such as an amine or alcohol), polyester, polyurea, polyurethane, or urea-urethane condensation. Under proper conditions, thin flexible encapsulating shell (wall) forms rapidly at the interface. A solution of the active material and a diacid chloride are emulsified in water and an aqueous solution containing an amine and a polyfunctional isocyanate is added. A base may be added to neutralize the acid formed during the reaction. Condensed polymer shells form instantaneously at the interface of the emulsion droplets. Interfacial cross-linking is derived from interfacial polycondensation, wherein cross-linking occurs between growing polymer chains and a multi-functional chemical groups to form an elastomer shell material.

In-situ polymerization: In some micro-encapsulation processes, active materials particles are fully coated with a monomer or oligomer first. Then, direct polymerization and cross-linking of the monomer or oligomer is carried out on the surfaces of these material particles.

Matrix polymerization: This method involves dispersing and embedding a core material in a polymeric matrix during formation of the particles. This can be accomplished via spray-drying, in which the particles are formed by evaporation of the solvent from the matrix material. Another possible route is the notion that the solidification of the matrix is caused by a chemical change.

Figure 1B:
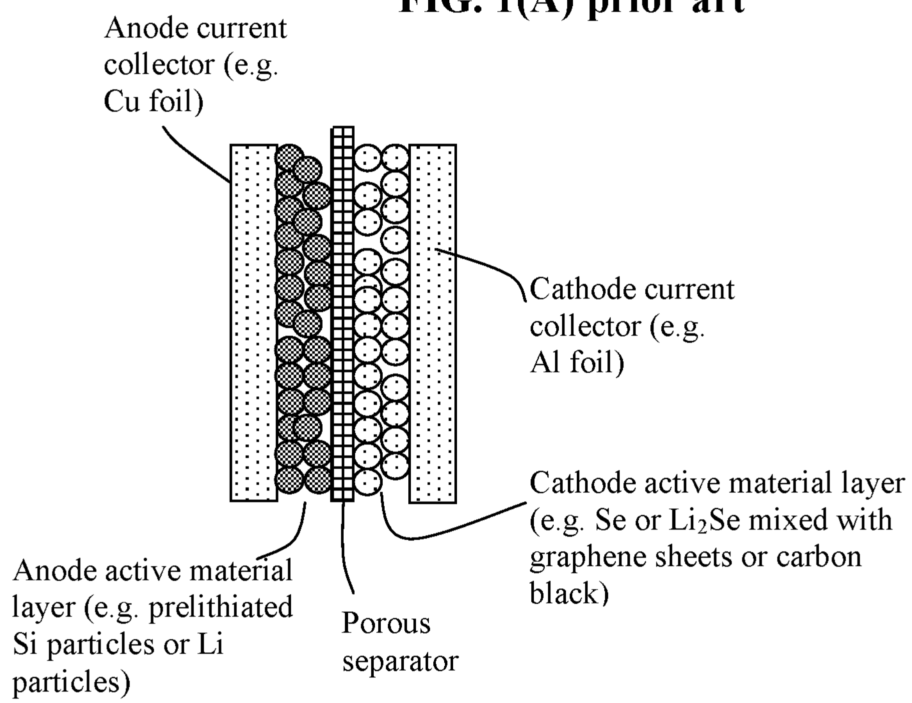
FIG. 1(B) Schematic of a prior art lithium-ion selenium battery; the anode layer being composed of particles of an anode active material (e.g. fully lithiated Si particles), a conductive additive (not shown) and a resin binder (not shown).
Figure 2:
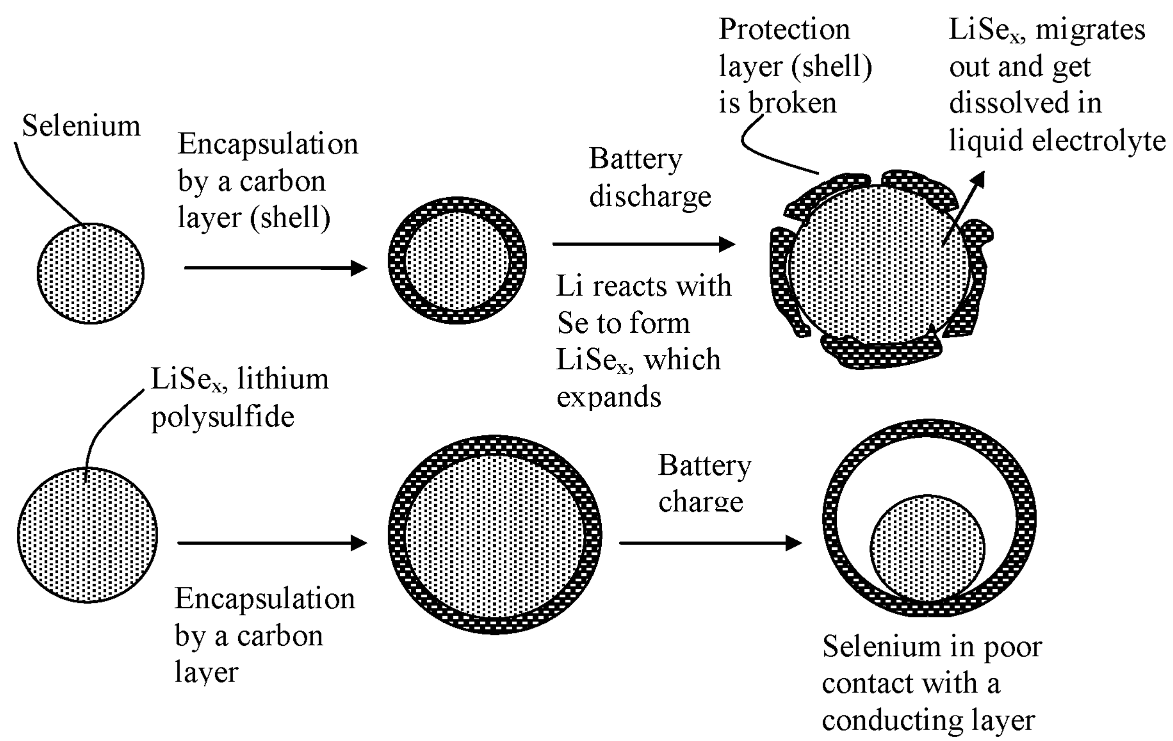
FIG. 2 Schematic illustrating the notion that expansion/shrinkage of electrode active material particles, upon lithium insertion and de-insertion during discharge/charge of a prior art lithium-ion battery, can lead to detachment of resin binder from the particles, interruption of the conductive paths formed by the conductive additive, and loss of contact with the current collector.

D. Additional Details about the Encapsulated Particulates, the Cathode Layer, and the Structure of Li—Se, Na—Se, and K—Se Cells The anode active material layer of an alkali metal-selenium cell can contain a foil or coating of Li, Na, or K metal supported by a current collector (e.g. Cu foil), as illustrated in the left-hand portion of FIG. 1(A) for a prior art Li—Se cell. Alternatively, the anode active material may contain, for instance, particles of prelithiated Si particles or surface-stabilized Li particles, as illustrated in the left-hand portion of FIG. 1(B). However, the cathode layer in the instant cell is distinct, as already discussed above.

The electrolyte for an alkali metal-selenium cell may be an organic electrolyte, ionic liquid electrolyte, gel polymer electrolyte, solid-state electrolyte (e.g. polymer solid electrolyte or inorganic solid electrolyte), quasi-solid electrolyte or a combination thereof. The electrolyte typically contains an alkali metal salt (lithium salt, sodium salt, and/or potassium salt) dissolved in a solvent.

The solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates ($LiPF3(CF_2CF_3)_3$), lithium bisperfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), and bis-trifluoromethyl sulfonylimide potassium ($KN(CF_3SO_2)_2$). Among them, $LiPF_6$, $LiBF_4$ and $LiN(CF_3SO_2)_2$ are preferred for Li—Se cells, $NaPF_6$ and $LiBF_4$ for Na—Se cells, and $KBF_4$ for K—Se cells. The content of aforementioned electrolytic salts in the non-aqueous solvent is preferably 0.5 to 3.0 M (mol/L) at the cathode side and 3.0 to >10 M at the anode side.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a Li—Se cell.

In the presently invented products (including the alkali metal cell, the cathode active layer, and the cathode active material powder), the core material (to be encapsulated by a thin layer of elastomer) contains the selenium-carbon hybrid, selenium-graphite hybrid, selenium-graphene hybrid, conducting polymer-selenium hybrid, metal selenide, selenium compound, etc. These hybrid or compound materials are produced in the form of particles that contain a mixture, blend, composite, or bonded entity of selenium or selenide with a carbon, graphite, graphene, or conducting polymer material. Metal selenides (e.g. lithium polyselenide, sodium polyselenide, etc.) and selenium compounds are readily available in a fine particle form. Selenium can be combined with a conducting material (carbon, graphite, graphene, and/or conducting polymer) to form a composite, mixture, or bonded entity (e.g. selenium bonded on graphene oxide surface).

There are many well-known procedures that can be used to make the aforementioned selenium-containing materials into particles. For instance, one may mix solid selenium with a carbon or graphite material to form composite particles using ball-milling. The resulting particles are typically ellipsoidal or potato-like in shape having a size from 1 to 20 μm. Also, one may infiltrate Se or selenide into the pores of porous carbon or graphite particles (e.g. activated carbon, mesoporous carbon, activated carbon fibers, etc.) using vapor phase infiltration, solution infiltration, chemical infiltration, or electrochemical infiltration. Alternatively, one may deposit selenium onto surfaces of graphene sheets, CNTs, carbon nanofibers, etc. and then form these Se-coated nanomaterials into a spherical or ellipsoidal shape using high-intensity ball-milling, spray-drying (of their suspensions), aerosol formation, etc. These particles are then encapsulated with an elastomer using the micro-encapsulation processes discussed above.

The cathode in a conventional Li—Se cell typically has less than 70% by weight of selenium in a composite cathode composed of selenium and the conductive additive/support. Even when the selenium content in the prior art composite cathode reaches or exceeds 70% by weight, the specific capacity of the composite cathode is typically significantly lower than what is expected based on theoretical predictions. For instance, the theoretical specific capacity of selenium is 675 mAh/g. A composite cathode composed of 70% selenium (Se) and 30% carbon black (CB), without any binder, should be capable of storing up to 675×70%=472 mAh/g. Unfortunately, the observed specific capacity is typically less than 75% of 472 mAh/g or 354 mAh/g (often less than 50% or 236 mAh/g in this example) of what could be achieved. In other words, the active material (Se) utilization rate is typically less than 75% (or even <50%). This has been a major issue in the art of Li—Se cells and there has been no solution to this problem.

Thus, it is highly advantageous to obtain a high selenium loading and yet, concurrently, maintaining an ultra-thin/small thickness/diameter of selenium for significantly enhanced selenium utilization efficiency, energy density and power density. For instance, one can deposit nanoscaled selenium (1-5 nm thick) on graphene surfaces using chemical, electrochemical, or vapor deposition to form Se-coated or Se-bonded graphene sheets. These Se-coated or Se-bonded graphene sheets are then aggregated together using a tumbling mixing, ball-milling, or spraying procedure. These steps enable the preparation of Se-conducting material hybrids that contain 85%-99% by weight selenium, yet maintaining a coating thickness or particle diameter from 1 nm to 5 nm. This ultra-small dimension enables fast lithium diffusion and lithium-selenium reactions, leading to high Se utilization efficiency (hence, high energy density) even at high charge-discharge rates. By implementing a elastomer around these hybrid particles or selenium compound/selenide particles, we have significantly reduced and even eliminated the shuttling effect, resulting in an alkali metal battery that has long cycle-life.

Again, the shuttling effect is related to the tendency for selenium or alkali metal polyselenide that forms at the cathode to get dissolved in the solvent and for the dissolved lithium polyselenide species to migrate from the cathode to the anode, where they irreversibly react with lithium to form species that prevent selenide from returning back to the cathode during the subsequent discharge operation of the Li—Se cell (the detrimental shuttling effect). It appears that the embracing elastomer has effectively trapped selenium and metal polyselenide therein, thereby preventing or reducing such a dissolution and migration issue. We have solved the most critical, long-standing problem of alkali metal-selenium batteries.

The anode active material may contain, as an example, lithium metal foil or a high-capacity Si, Sn, or $SnO_2$ capable of storing a great amount of lithium. The cathode active material may contain pure selenium (if the anode active material contains lithium), lithium polyselenide, or any selenium containing compound, molecule, or polymer. If the cathode active material includes lithium-containing species (e.g. lithium polyselenide) when the cell is made, the anode active material can be any material capable of storing a large amount of lithium (e.g. Si, Ge, Sn, $SnO_2$, etc.).

At the anode side, when lithium metal is used as the sole anode active material in a Li—Se cell, there is concern about the formation of lithium dendrites, which could lead to internal shorting and thermal runaway. Herein, we have used two approaches, separately or in combination, to address this dendrite formation issue: one involving the use of a high-concentration electrolyte at the anode side and the other the use of a nanostructure composed of conductive nanofilaments. For the latter, multiple conductive nanofilaments are processed to form an integrated aggregate structure, preferably in the form of a closely packed web, mat, or paper, characterized in that these filaments are intersected, overlapped, or somehow bonded (e.g., using a binder material) to one another to form a network of electron-conducting paths.

The integrated structure has substantially interconnected pores to accommodate electrolyte. The nanofilament may be selected from, as examples, a carbon nanofiber (CNF), graphite nanofiber (GNF), carbon nanotube (CNT), metal nanowire (MNW), conductive nanofibers obtained by electro-spinning, conductive electro-spun composite nanofibers, nanoscaled graphene platelet (NGP), or a combination thereof. The nanofilaments may be bonded by a binder material selected from a polymer, coal tar pitch, petroleum pitch, mesophase pitch, coke, or a derivative thereof.

Nanofibers may be selected from the group consisting of an electrically conductive electro-spun polymer fiber, electro-spun polymer nanocomposite fiber comprising a conductive filler, nanocarbon fiber obtained from carbonization of an electrospun polymer fiber, electro-spun pitch fiber, and combinations thereof. For instance, a nanostructured electrode can be obtained by electro-spinning of polyacrylonitrile (PAN) into polymer nanofibers, followed by carbonization of PAN. It may be noted that some of the pores in the structure, as carbonized, are greater than 100 nm and some smaller than 100 nm.

The presently invented cathode active layer may be incorporated in one of at least four broad classes of rechargeable lithium metal cells (or, similarly, for sodium metal or potassium metal cells):

- (A) Lithium metal-selenium with a conventional anode configuration: The cell contains an optional cathode current collector, a presently invented cathode layer, a separator/electrolyte, and an anode current collector. Potential dendrite formation may be overcome by using a high-concentration electrolyte or solid-state electrolyte at the anode.
- (B) Lithium metal-selenium cell with a nanostructured anode configuration: The cell contains an optional cathode current collector, a cathode herein invented, a separator/electrolyte, an optional anode current collector, and a nanostructure to accommodate lithium metal that is deposited back to the anode during a charge or re-charge operation. This nanostructure (web, mat, or paper) of nanofilaments provide a uniform electric field enabling uniform Li metal deposition, reducing the propensity to form dendrites. This configuration can provide a dendrite-free cell for a long and safe cycling behavior.
- (C) Lithium ion-selenium cell with a conventional anode: For instance, the cell contains an anode composed of anode active graphite particles bonded by a binder, such as polyvinylidene fluoride (PVDF) or styrene-butadiene rubber (SBR). The cell also contains a cathode current collector, a cathode of the instant invention, a separator/electrolyte, and an anode current collector; and
- (D) Lithium ion-selenium cell with a nanostructured anode: For instance, the cell contains a web of nanofibers coated with Si coating or bonded with Si nanoparticles. The cell also contains an optional cathode current collector, a cathode herein invented, a separator/electrolyte, and an anode current collector. This configuration provides an ultra-high capacity, high energy density, and a safe and long cycle life.

In the lithium-ion selenium cell (e.g. as described in (C) and (D) above), the anode active material can be selected from a wide range of high-capacity materials, including (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd), and lithiated versions thereof, (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, selenides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof; and combinations thereof. Non-lithiated versions may be used if the cathode side contains lithium polyselenides or other lithium sources when the cell is made.

A possible lithium metal cell may be comprised of an anode current collector, an electrolyte phase (optionally but preferably supported by a porous separator, such as a porous polyethylene-polypropylene co-polymer film), a cathode of the instant invention, and an optional cathode collector.

For a sodium ion-selenium cell or potassium ion-selenium cell, the anode active material layer can contain an anode active material selected from the group consisting of: (a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof, (b) Sodium- or potassium-containing alloys or intermetallic compounds of Si, Ge, Sn, Pb, Sb, Bi, Zn, Al, Ti, Co, Ni, Mn, Cd, and their mixtures; (c) Sodium- or potassium-containing oxides, carbides, nitrides, selenides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Sodium or potassium salts; (e) particles of graphite, hard carbon, soft carbon or carbon particles and pre-sodiated versions thereof (pre-doped or pre-loaded with Na), and combinations thereof.

The following examples are presented primarily for the purpose of illustrating the best mode practice of the present invention and should not be construed as limiting the scope of the present invention.

Example 1: Preparation of Se Nanoparticles from $SeO_2$ and Ascorbic Acid

The starting materials include $SeO_2$, ascorbic acid (Vc) and polysaccharides (CTS and CMC, separately). The CTS is a water-soluble chitosan having a 73.5% degree of deacetylation and viscosity-average molecular weight of 4200; and CMC is carboxymethyl cellulose having a degree of substitution of 0.8 and molecular weight of 110,000. The aqueous solutions of the materials were obtained by, for instance, dissolving 0.4 g of $SeO_2$ in 150 mL of de-ionized water under vigorous stirring.

For the preparation of selenium nanoparticles, appropriate amounts of polysaccharides, such as CTS or CMC solutions, were mixed with selenious acid solution (the aqueous solution of $SeO_2$), respectively. Subsequently, the ascorbic acid solution was added into the mixtures to initiate the reaction. In the reaction solution, the typical concentrations of CTS, CMC, selenious acid and ascorbic acid were 0.04%, 0.25%, $1\times10^{-3}$ and $4\times10^{-3}$ M, respectively. No stirring was conducted except the initial mixing of the reactants. The selenious acid solutions were converted from colorless to red gradually after the addition of the ascorbic acid. The resulting product mixtures were then dried in a vacuum oven to collect Se nanoparticle powders. The reactions may be accelerated by using a slightly higher temperature (e.g. 80° C. instead of room temperature) and/or assisted by ultrasonic treatment.

Example 2: Preparation of Se Nanoparticles and Graphene-Wrapped Se from $Na_2SeO_3$ and GO Hollow and solid Se nanospheres were produced from $Na_2SeO_3$ by varying the amount of cetyltrimethyl ammonium bromide (CTAB) in the reaction system. In a representative procedure, 0.025 mol of sodium selenite ($Na_2SeO_3$) and 0.05 mol of ascorbic acid were separately dissolved in 50 mL mixed solution (Vwater/Vethanol=1:1) with the assistance of CTAB at ambient temperature. After adding the ascorbic acid, the red solution turned to brick red. The color phenomenon was due to the formation of a-Se particles. After 18 h, the products were washed with water and absolute ethanol. Subsequently the product changed progressively from red to gray, indicating that the amorphous Se phase had transformed to a trigonal phase (t-Se). The content of CTAB could be changed to get different morphologies of the nano Se.

Example 3: Preparation of Selenium Nanowires

Selenium nanowires were synthesized from $SeO_2$. In a typical reaction process, $SeO_2$ (0.25 g) and β-cyclodextrin (0.25 g) were added into a glass beaker containing 50 mL distilled water. The mixture was stirred for about 10 min to give a clear solution, which was promptly poured into another glass beaker containing ascorbic acid solution (50 mL, 0.028M) under continuous stirring. After reacting for 4 h, the product was collected by centrifugation and washed with deionized water and absolute ethanol several times. Then it was re-dispersed in ethanol and allowed to age for 2 h without stirring. Subsequently, the products were dried in a vacuum at 60° C. for 5 h to recover Se nanowires.

Example 4: Hydrothermal Synthesis of Se Nanowires from $(NH_4)_2S_2O_3$ and $Na_2SeO_3$ A low-temperature hydrothermal synthesis route was conducted for direct production of crystalline trigonal selenium nanowires, using $(NH_4)_2S_2O_3$ and $Na_2SeO_3$ as the starting materials in the presence of a surfactant, sodium dodecyl sulfate (SDS). In a typical procedure, equivalent molar amounts of $(NH_4)_2S_2O_3$ and $Na_2SeO_3$ (10 mmol) were added to an aqueous solution (50 mL) of SDS (0.325 g). The solution was stirred for approximately 20 min until the solids had completely dissolved, and a 0.2 M homogeneous solution was formed. The solution was then transferred to a Teflon-lined autoclave having a capacity of 60 mL. The autoclave was sealed and heated at 110° C. for 17 h, and then allowed to cool to room temperature naturally over a period of about 5 h. The resulting precipitate was rinsed with distilled water and absolute alcohol several times. After drying in vacuo at 40° C. for 4 h, the orange-red powders were collected. The hydrothermal synthesis of t-Se nanowires may be described by the following chemical reaction:

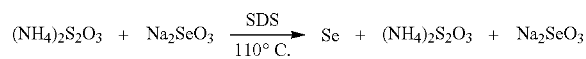

$$(NH_4)_2S_2O_3 + Na_2SeO_3 \xrightarrow[110^\circ\ C.]{SDS} Se + (NH_4)_2S_2O_3 + Na_2SeO_3$$

The product yield was approximately 95%.

Example 5: Preparation of Se Nanoplatelets

In a typical synthesis procedure, 1 mmol commercial Se powder and 20 mL ethylenediamine were poured into a Teflon-lined autoclave with a capacity of 30 mL. The autoclave was sealed and maintained at 160° C. for 2 h and then cooled to room temperature to produce a brown homogeneous solution. Subsequently, 100 mL acetone at −18° C. was injected into the brown homogeneous solution, and a brick-red mixture was obtained. After aging the brick-red mixture for 24 hours at −18° C., the precipitates were centrifuged, washed several times with distilled water and absolute alcohol, and finally dried in air at 60° C. for 24 h. The powder was then subjected to ball-milling for 30-60 minutes to obtain Se nanoplatelets. Some of the Se nanoplatelets were poured into a graphene suspension obtained in Example 9 to make a slurry, which was spray-dried to yield pristine graphene-wrapped Se nanoplatelets.

Example 6: Preparation of Tetragonal Selenium Nanowires and Nanotubes

In a typical procedure of synthesizing Se nanowires, 0.52 g $Na_2SeO_3$ and 2 g glucose were dissolved in 320 mL water hosted in a 500 mL beaker. After mixing for 20 min under vigorous magnetic stirring, the beaker containing the mixture solution was sealed and maintained in an oven at 85° C. A hot turbid brick-red solution was obtained, indicating the amorphous selenium being generated. The hot solution was cooled down by cold water in order to quench the reaction. The product was collected by centrifugation and washed several times with deionized water to remove the impurities. The final brick-red product was re-dispersed in 10 mL absolute ethanol to form a dispersion in a glass bottle, and then sealed and stored in darkness for further growth of Se nanowires. After this dispersion was aged for one week at room temperature, a sponge-like black-gray solid (containing Se nanowires) was formed at the bottom and the color of upper solution changed to colorless transparent. The synthesis of Se nanotubes was conducted under different conditions: 1.03 g $Na_2SeO_3$ and 3 g glucose were dissolved in 100 mL water hosted in a 250 mL beaker. After the solution was under constant stirring for 20 min, the beaker containing the mixture solution was sealed and then maintained at 85° C. for 4 h in an oven.

Example 7: Mixing of Selenium with Carbon/Graphite Particles Via Ball-Milling to Form Selenium-Containing Particles Selenium particles and particles of soft carbon (graphitizable disordered carbon), natural graphite, mesophase carbon, expanded graphite flakes, carbon nanofibers, and graphene sheets (0% to 95% by weight of Se in the resulting composite) were physically blended and then subjected to ball milling for 2-24 hours to obtain Se-containing composite particles (typically in a ball or potato shape). The particles, having a typical size of 1-10 μm, containing various Se contents, were then embraced with a thin layer of elastomer. Some of the resulting particulates were then made into a layer of cathode.

Example 8: Simple Selenium Melt or Liquid Solution Mixing

One way to combine selenium with a conducting material (e.g. carbon/graphite particles) is to use a solution or melt mixing process. Highly porous activated carbon particles, chemically etched mesocarbon microbeads (activated MCMBs), and exfoliated graphite worms were mixed with selenium melt at 222-230° C. (slightly above the melting point of Se, 221° C.) for 10-60 minutes to obtain selenium-impregnated carbon particles.

Example 9: Electrochemical Impregnation of Se in Various Porous Carbon/Graphite Particles The electrochemical impregnation of S into pores of activated carbon fibers, activated carbon nanotubes, and activated artificial graphite particles was conducted by aggregating these particles/fibers into a loosely packed layer. In this approach, an anode, electrolyte, and a layer of such a loosely packed structure (serving as a cathode layer) are positioned in an external container outside of a lithium-selenium cell. The needed apparatus is similar to an electroplating system, which is well-known in the art.

In a typical procedure, a metal polyselenide ($M_xSe_y$) was dissolved in a solvent (e.g. mixture of DOL/DME in a volume ratio from 1:3 to 3:1) to form an electrolyte solution. An amount of a lithium salt may be optionally added, but this is not required for external electrochemical deposition. A wide variety of solvents can be utilized for this purpose and there is no theoretical limit to what type of solvents can be used; any solvent can be used provided that there is some solubility of the metal polyselenide in this desired solvent. A greater solubility would mean a larger amount of selenium can be derived from the electrolyte solution.

The electrolyte solution was then poured into a chamber or reactor under a dry and controlled atmosphere condition (e.g. He or nitrogen gas). A metal foil was used as the anode and a layer of the porous structure as the cathode; both being immersed in the electrolyte solution. This configuration constitutes an electrochemical impregnation and deposition system. The step of electrochemically impregnating selenium into pores was conducted at a current density in the range of 1 mA/g to 10 A/g, based on the layer weight of the porous carbon/graphite particles/fibers.

The chemical reactions that occur in this reactor may be represented by the following equation: $M_xSe_y \rightarrow M_xSe_{y-z} + zSe$ (typically z=1-4). The selenium coating thickness or particle diameter and the amount of Se coating/particles impregnated may be controlled by the electrochemical reaction current density, temperature and time. In general, a lower current density and lower reaction temperature lead to a more uniform impregnation of Se and the reactions are easier to control. A longer reaction time leads to a larger amount of Se saturated in the pores. Additionally, the electrochemical method is capable of rapidly converting the impregnated Se into metal polyselenide (lithium polyselenide, sodium polyselenide, and potassium polyselenide, etc.).

Example 10: Chemical Reaction-Induced Impregnation of Selenium

A chemical impregnation method was herein utilized to prepare Se-impregnated carbon fibers that have been chemically activated. The procedure began with adding 0.58 g $Na_2Se$ into a flask that had been filled with 25 ml distilled water to form a $Na_2Se$ solution. Then, 0.72 g elemental Se was suspended in the $Na_2Se$ solution and stirred with a magnetic stirrer for about 2 hours at room temperature. The color of the solution changed slowly to orange-yellow as the selenium dissolved. After dissolution of the selenium, a sodium polyselenide ($Na_2Se_x$) solution was obtained where $4 \leq x \leq 10$.

Subsequently, a selenium-impregnated carbon fiber sample was prepared by a chemical impregnation method in an aqueous solution. First, 180 mg of expansion-treated carbon fibers was suspended in 180 ml ultrapure water with a surfactant and then sonicated at 50° C. for 5 hours to form a stable carbon fiber dispersion. Subsequently, the $Na_2Se_x$ solution was added to the above-prepared dispersions in the presence of 5 wt % surfactant cetyl trimethyl-ammonium bromide (CTAB), the as-prepared carbon fiber/$Na_2Se_x$ blended solution was sonicated for another 2 hours and then titrated into 100 ml of 2 mol/L HCOOH solution at a rate of 30-40 drops/min and stirred for 2 hours. Finally, the precipitate was filtered and washed with acetone and distilled water several times to eliminate salts and impurities. After filtration, the precipitate was dried at 50° C. in a drying oven for 48 hours. The reaction may be represented by the following reaction: $Se_x^{2-} + 2H^+ \rightarrow (x-1)\ Se + H_2Se$.

Example 11: Redox Chemical Reaction-Induced Impregnation of Selenium in Activated MCMBs and Activated Needle Coke In this chemical reaction-based deposition process, sodium thiosulfate ($Na_2Se_2O_3$) was used as a selenium source and HCl as a reactant. An activated MCMB-water or activated needle coke-water suspension was prepared and then the two reactants (HCl and $Na_2Se_2O_3$) were poured into this suspension. The reaction was allowed to proceed at 25-75° C. for 1-3 hours, leading to impregnation of S into pores of the activated structures. The reaction may be represented by the following reaction: $2HCl + Na_2Se_2O_3 \rightarrow 2NaCl + Se\downarrow + SeO_2 + H_2O$.

Example 12: Elastomer-Encapsulated Se Nanoparticles, Nanowires, and Nanoplatelets Selenium nanoparticles, nanowires, and nanoplatelets were dispersed in a polymer solution (rubber prior to curing, dissolved in a liquid solvent) to form various suspensions or slurries. The micro-encapsulation techniques discussed earlier (spray-drying, vibration-nozzle, and pan-coating, etc.) were used to produce powder masses (multiple particulates) of elastomer-encapsulated Se nanoparticles, nanowires, and nanoplatelets. As examples, the following polymers were used: SBR, cis-polyisoprene, EPDM, polyurethane, and urethane-urea copolymer.

For electrochemical testing, as an example, the working electrodes were prepared by mixing 85 wt. % active material (encapsulated particulates or non-encapsulated Se particles, etc.), 7 wt. % acetylene black (Super-P), and 8 wt. % polyvinylidene fluoride (PVDF) binder dissolved in N-methyl-2-pyrrolidinoe (NMP) to form a slurry of 5 wt. % total solid content. After coating the slurries on Al foil, the electrodes were dried at 120° C. in vacuum for 2 h to remove the solvent before pressing. Then, the electrodes were cut into a disk (4=12 mm) and dried at 100° C. for 24 h in vacuum. Electrochemical measurements were carried out using CR2032 (3V) coin-type cells with lithium metal foil or sodium foil as the counter/reference electrode, Celgard 2400 membrane as separator, and 1 M $LiPF_6$ electrolyte solution dissolved in a mixture of ethylene carbonate (EC) and diethyl carbonate (DEC) (EC-DEC, 1:1 v/v). The cell assembly was performed in an argon-filled glove-box. The CV measurements were carried out using a CH-6 electrochemical workstation at a scanning rate of 0.5-5.0 mV/s.

Example 13: Effect of Lithium Ion-Conducting Additive in an Elastomer Shell

A wide variety of lithium ion-conducting additives were added to several different elastomer matrix materials to prepare encapsulation shell materials for protecting core particles of an anode active material. We have discovered that these elastomer composite materials are suitable encapsulation shell materials provided that their lithium ion conductivity at room temperature is no less than $10^{-7}$ S/cm. With these materials, lithium ions appear to be capable of readily diffusing in and out of the encapsulation shell having a thickness no greater than 1 μm. For thicker shells (e.g. 10 μm), a lithium ion conductivity at room temperature no less than $10^{-4}$ S/cm would be required.

TABLE 1

Lithium ion conductivity of various elastomer composite compositions as a shell material for protecting anode active material particles.

| Sample No. | Lithium-conducting additive | Elastomer (1-2 μm thick) | Li-ion conductivity (S/cm) |
|---|---|---|---|
| E-1 | $Li_2CO_3$ + $(CH_2OCO_2Li)_2$ | 70-99% polyurethane | $2.7 \times 10^{-6}$ to $1.8 \times 10^{-3}$ S/cm |
| E-2 | $Li_2CO_3$ + $(CH_2OCO_2Li)_2$ | 65-99% polyisoprene | $6.1 \times 10^{-6}$ to $3.6 \times 10^{-4}$ S/cm |
| E-3 | $Li_2CO_3$ + $(CH_2OCO_2Li)_2$ | 65-99% SBR | $6.5 \times 10^{-6}$ to $5.2 \times 10^{-4}$ S/cm |
| D-4 | $Li_2CO_3$ + $(CH_2OCO_2Li)_2$ | 70-99% urethane-urea | $7.4 \times 10^{-7}$ to $4.3 \times 10^{-4}$ S/cm |
| D-5 | $Li_2CO_3$ + $(CH_2OCO_2Li)_2$ | 75-99% polybutadiene | $8.7 \times 10^{-6}$ to $3.6 \times 10^{-3}$ S/cm |
| B1 | LiF + LiOH + $Li_2C_2O_4$ | 80-99% chloroprene rubber | $8.7 \times 10^{-7}$ to $2.1 \times 10^{-4}$ S/cm |
| B2 | LiF + HCOLi | 80-99% EPDM | $2.1 \times 10^{-6}$ to $8.6 \times 10^{-4}$ S/cm |
| B3 | LiOH | 70-99% polyurethane | $2.8 \times 10^{-5}$ to $1.2 \times 10^{-3}$ S/cm |
| B4 | $Li_2CO_3$ | 70-99% polyurethane | $4.4 \times 10^{-5}$ to $3.9 \times 10^{-3}$ S/cm |
| B5 | $Li_2C_2O_4$ | 70-99% polyurethane | $9.3 \times 10^{-6}$ to $7.7 \times 10^{-4}$ S/cm |
| B6 | $Li_2CO_3$ + LiOH | 70-99% polyurethane | $1.4 \times 10^{-5}$ to $1.6 \times 10^{-3}$ S/cm |
| C1 | $LiClO_4$ | 70-99% urethane-urea | $4.8 \times 10^{-5}$ to $2.2 \times 10^{-3}$ S/cm |
| C2 | $LiPF_6$ | 70-99% urethane-urea | $2.4 \times 10^{-5}$ to $8.2 \times 10^{-4}$ S/cm |
| C3 | $LiBF_4$ | 70-99% urethane-urea | $1.2 \times 10^{-5}$ to $1.2 \times 10^{-4}$ S/cm |
| C4 | LiBOB + $LiNO_3$ | 70-99% urethane-urea | $6.8 \times 10^{-6}$ to $1.2 \times 10^{-4}$ S/cm |
| S1 | Sulfonated polyaniline | 85-99% SBR | $6.3 \times 10^{-6}$ to $4.2 \times 10^{-4}$ S/cm |
| S2 | Sulfonated SBR | 85-99% SBR | $5.2 \times 10^{-6}$ to $2.2 \times 10^{-4}$ S/cm |
| S3 | Sulfonated PVDF | 80-99% chlorosulfonated polyethylene (CS-PE) | $3.3 \times 10^{-6}$ to $2.8 \times 10^{-4}$ S/cm |
| S4 | Polyethylene oxide | 80-99% CS-PE | $4.9 \times 10^{-6}$ to $3.7 \times 10^{-4}$ S/cm |

and recharging cycles were observed using both transmission electron microscopy (TEM) and scanning electron microscopy (SEM).

Figure 5:
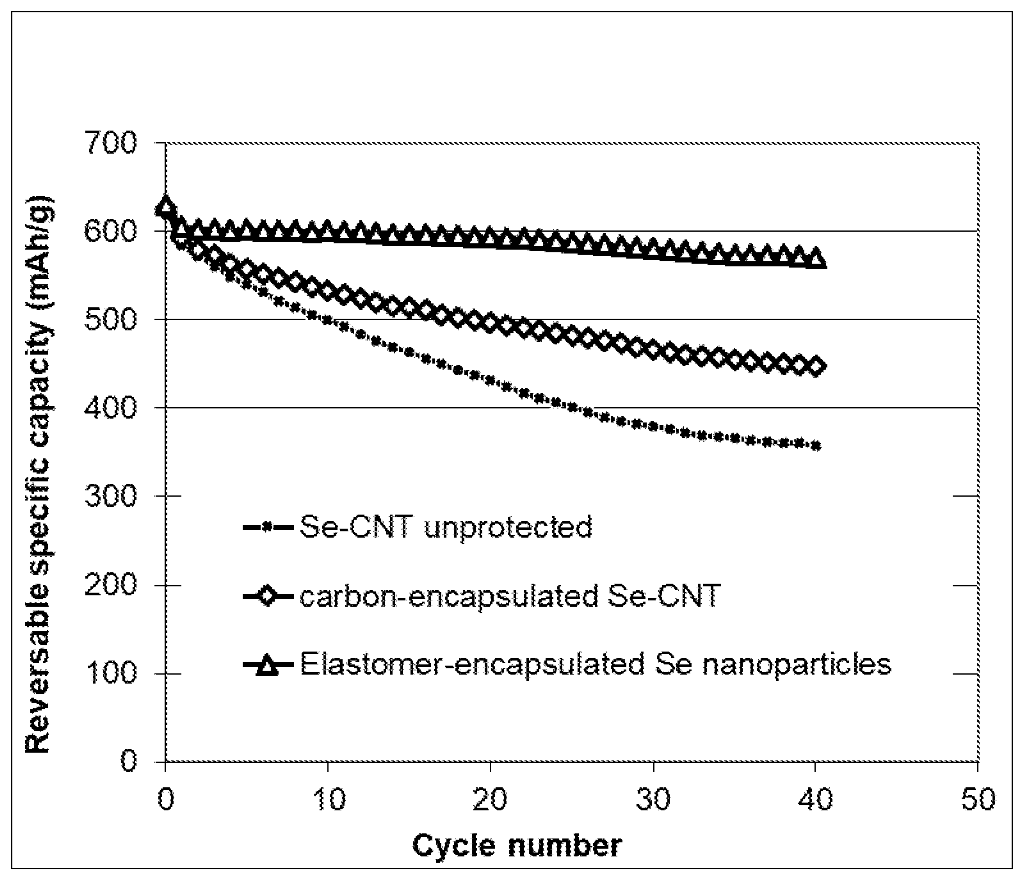
FIG. 5 The specific discharge capacity values of three Li—Se battery having a Se/CNT cathode active material featuring (1) SBR-encapsulated Se/CNT particles, (2) carbon-encapsulated Se/CNT particles, and (3) un-protected Se/CNT particles, respectively.

The cycling behaviors of 3 cells prepared in Example 10 are shown in FIG. 5, which indicates that elastomer encapsulation of Se-based particles, with or without carbon coating, provides the most stable cycling response. Carbon coating alone does not help to improve cycling stability by much.

Example 14: Cycle Stability of Various Rechargeable Lithium-Selenium Battery Cells Several series of Li metal-selenium and Li-ion selenium cells were prepared using the presently prepared cathode layers. The first series is a Li metal cell containing a copper foil as an anode current collector and the second series is also a Li metal cell having a nanostructured anode of conductive filaments (based on electro-spun carbon fibers or CNFs). The third series is a Li-ion cell having a nanostructured anode of conductive filaments (based on electro-spun carbon fibers coated with a thin layer of Si using CVD) plus a copper foil current collector. The fourth series is a Li-ion cell having a prelithiated graphite-based anode active material as an example of the more conventional anode. We have found that after large numbers of charge/discharge cycles, the cells containing a nanostructured anode were essentially dendrite-free.

Charge storage capacities were measured periodically and recorded as a function of the number of cycles. The specific discharge capacity herein referred to is the total charge inserted into the cathode during the discharge, per unit mass of the composite cathode (counting the weights of cathode active material, conductive additive or support, binder, and any optional additive combined). The specific charge capacity refers to the amount of charges per unit mass of the composite cathode. The specific energy and specific power values presented in this section are based on the total cell weight. The morphological or micro-structural changes of selected samples after a desired number of repeated charging and recharging cycles were observed using both transmission electron microscopy (TEM) and scanning electron microscopy (SEM).

Figure 6:
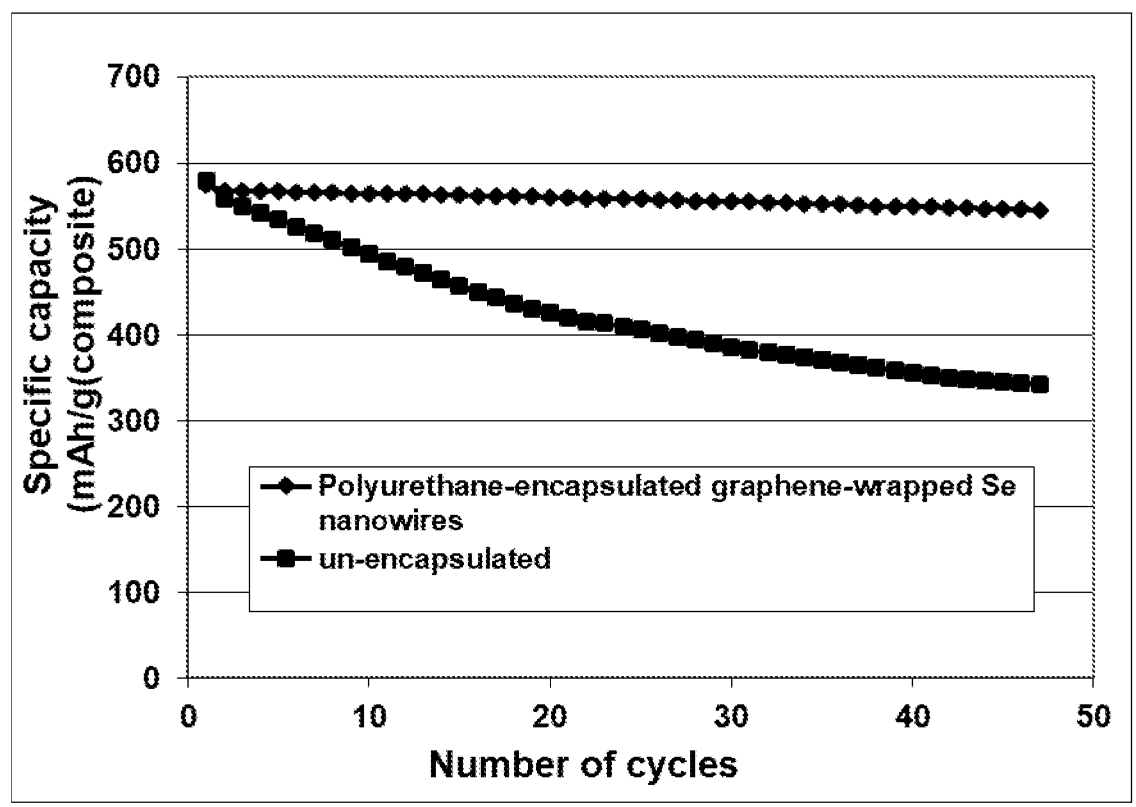
FIG. 6 The cycling behaviors of 2 Li—Se cells: one cell has a cathode containing particulates of polyurethane-encapsulated selenium-CNT composite balls and the other cell has a cathode containing particulates of un-protected selenium-CNT composite balls.

Shown in FIG. 6 are the cycling behaviors of 2 Li—Se cells prepared in Example 9; one cell has a cathode containing particulates of polyurethane-encapsulated selenium-CNT composite balls and the other cell has a cathode containing particulates of un-protected selenium-CNT composite balls. The elastomer has imparted cycle stability to the Li—Se cell in a most dramatic manner.

Figure 7:
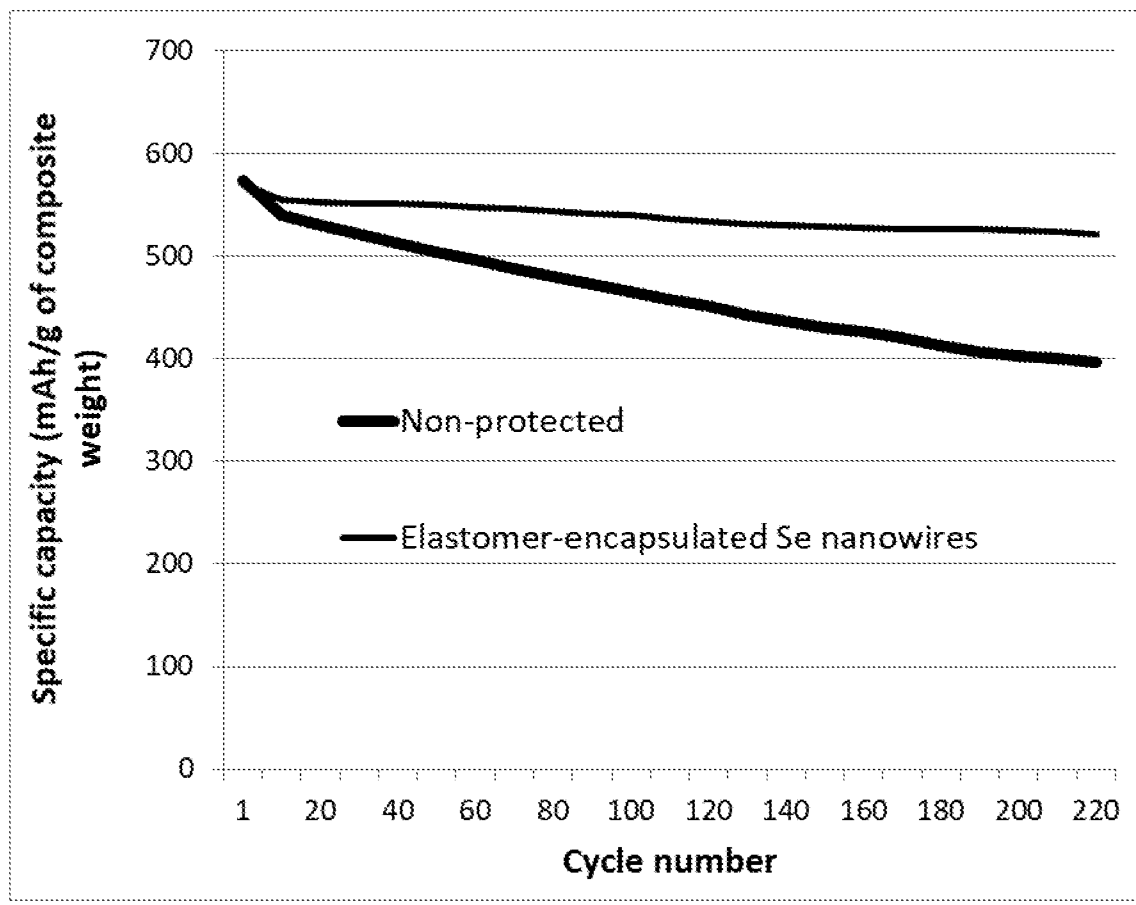
FIG. 7 The specific discharge capacity values of two Li—Se cells having a cathode active material layer featuring (1) urethane-urea copolymer-encapsulated, selenium-MCMB (activated) composite particles; and (2) un-protected selenium-MCMB (activated) composite particles, respectively.

FIG. 7 shows the cycling behavior of two room-temperature Li—Se cell: one cell has a cathode containing particulates of urethane-urea copolymer-encapsulated selenium-MCMB (activated) composite particles and the other cell has a cathode containing particulates of un-protected selenium-MCMB (activated) composite particles. Again, the elastomer has significantly improved the cycle stability of the Li—Se cell.

The above cycling stability data have clearly demonstrated that the shuttling effect commonly associated with Li—Se cells has been significantly reduced or essentially eliminated by the presently invented elastomer encapsulation approach.

Figure 8:
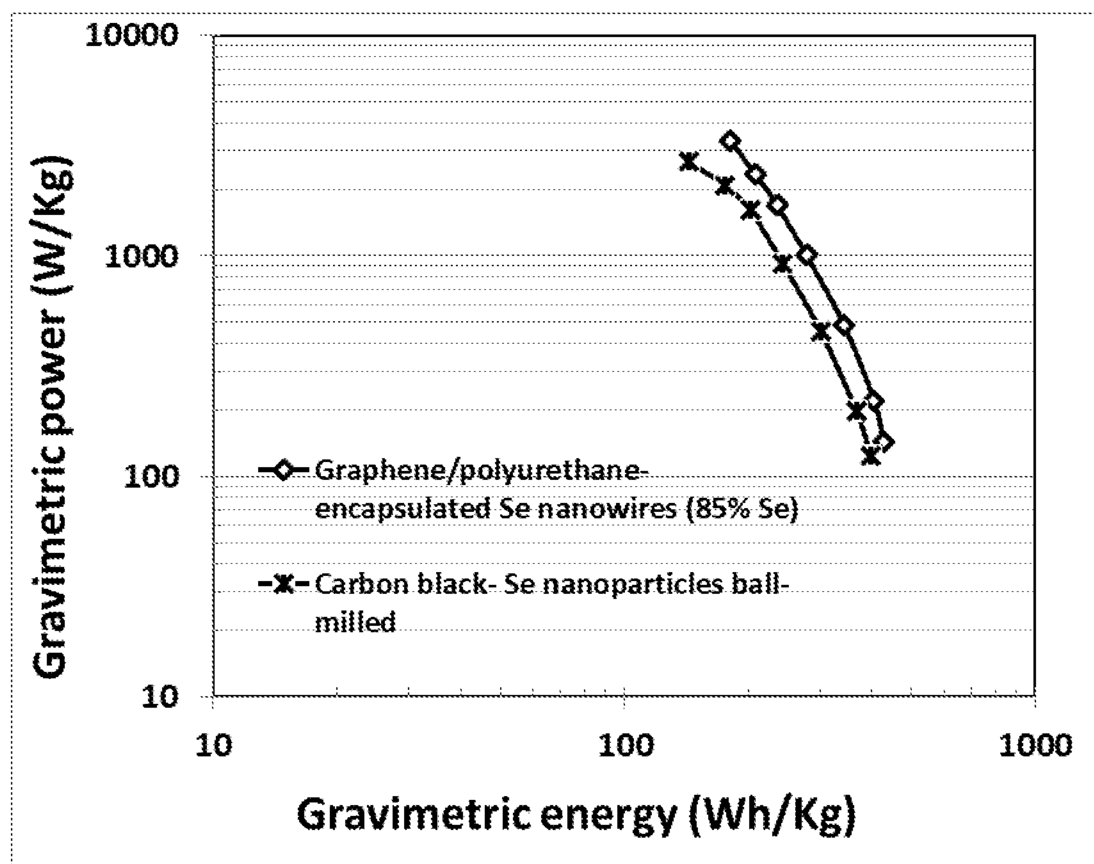
FIG. 8 Ragone plots (cell power density vs. cell energy density) of two Li metal-selenium cells: one featuring a cathode layer composed of elastomer-encapsulated Se nanowires and the other a cathode of carbon black-Se nanoparticles ball-milled together.
Figure 9:
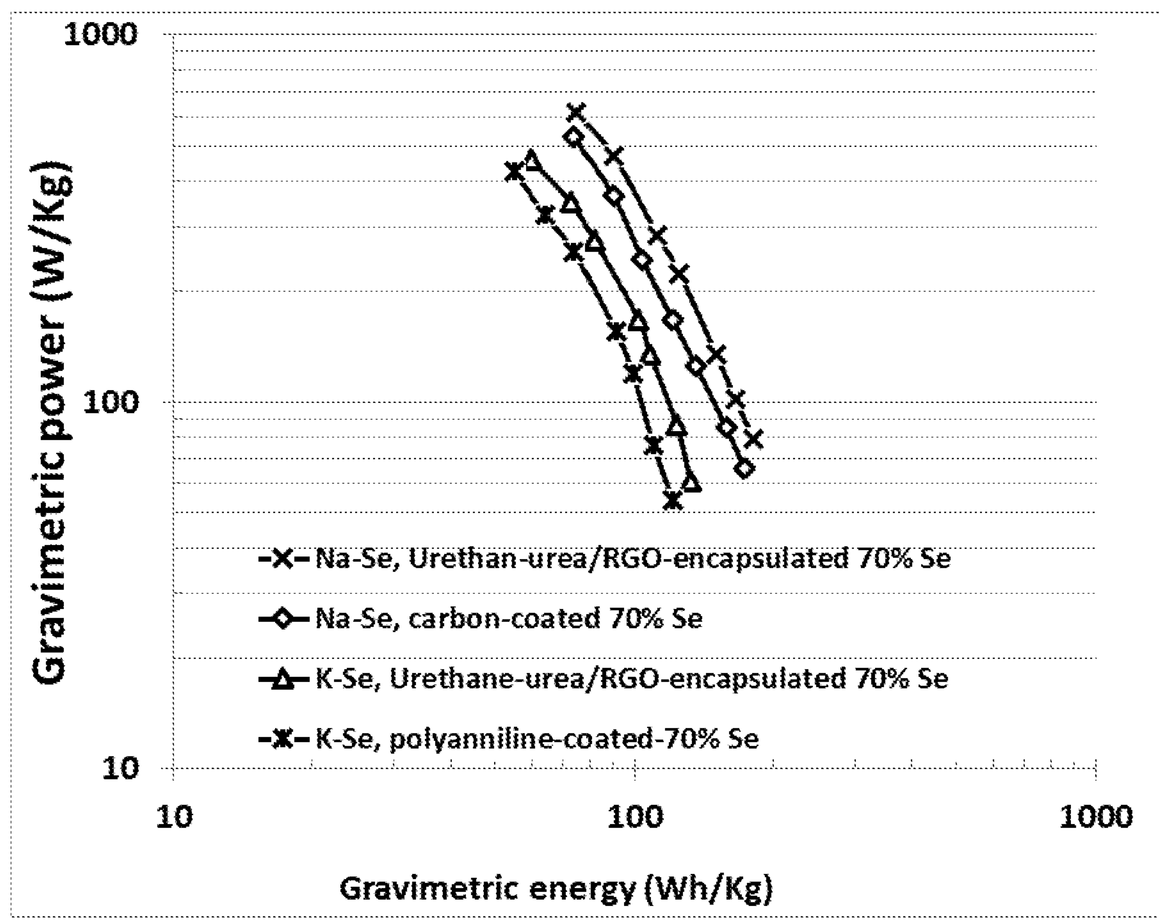
FIG. 9 Ragone plots (cell power density vs. cell energy density) of four alkali metal-selenium cells: Na—Se cell featuring elastomer/RGO-encapsulated particles of selenium, Na—Se cell featuring carbon-coated Se particles, K—Se cell featuring elastomer/RGO-encapsulated Se particles, and K—Se cell featuring polyaniline-coated Se particles.

FIG. 8 shows the Ragone plots (cell power density vs. cell energy density) of two Li metal-selenium cells: one featuring a cathode layer composed of elastomer-encapsulated Se nanowires and the other a cathode of carbon black-Se nanoparticles ball-milled together. FIG. 9 shows the Ragone plots (cell power density vs. cell energy density) of 4 alkali metal-selenium cells: Na—Se cell featuring elastomer/RGO-encapsulated particles of selenium, Na—Se cell featuring carbon-coated Se particles, K—Se cell featuring elastomer/RGO-encapsulated Se particles, and K—Se cell featuring polyaniline-coated Se particles.

FIG. 8 and FIG. 9 indicate that the presence of a elastomer embracing a selenium-based cathode active material does not compromise the energy density of an alkali metal-selenium cell based on the consideration that this polymer shell is normally less electron-conducting than a carbon coating and less ion-conducting than a liquid electrolyte. To the contrary, the energy density of the cell actually can be improved using the presently invented elastomer encapsulation approach.

In lithium battery industry, it is a common practice to define the cycle life of a battery as the number of charge-discharge cycles that the battery suffers 20% decay in capacity based on the initial capacity measured after the required electrochemical formation. Summarized in Table 2 below are the cycle life data of a broad array of batteries featuring presently invented elastomer-encapsulated selenium cathode particles vs. other types of cathode active materials.

TABLE 2

Cycle life data of various lithium secondary (rechargeable) batteries.

| Sample ID | Protective means | Type & % of anode active material | Initial capacity (mAh/g) | Cycle life (No. of cycles) |
|---|---|---|---|---|
| CNF-1 | SBR encapsulation | 80% by wt. Se + 7% CNF + 3% SBR + 5% binder + 5% CB | 532 | 1,766 |
| CNF-2 | Carbon encapsulation | 80% by wt. Se + 7% CNF + 3% carbon + 5% binder + 5% CB | 520 | 154 |
| AC-1 | No encapsulation | 70% Se + 15% AC + 8% binder + 7% CB | 452 | 176 |
| AC-2 | Encapsulated by Polyurethane (75%) + ethylene oxide (25%) | 70% Se + 15% AC + 3% polymer mixture + 5% binder + 7% CB | 455 | 1,445 |
| Gn-3 | Polyisoprene encapsulation | 90% S (coated on graphene sheets) | 601 | 1,212 |
| Gn-4 | Carbon encapsulation | 90% Se (coated on graphene sheets) | 488 | 182 |
| CB-1 | No encapsulation | 70% Se + 22% CB + 8% binder | 453 | 66 |
| CB-2 | Urethan-urea copolymer encapsulation | 70% Se + 20% CB + 4% co-polymer + 6% binder | 460 | 1578 |

The following observations can be made from the data of Table 2 and FIG. 5-FIG. 9:

1) The presently invented approach enables the Li—Se, Na—Se, and K—Se batteries to deliver high cycling stability.
2) The invented approach also leads to alkali metal-selenium batteries having exceptional energy densities and power densities. A cell-level energy density as high as 428 Wh/kg has been achieved with Li—Se cells featuring a cathode active material encapsulated by a elastomer. Also quite surprisingly, the cell delivers a power density as high as 3318 W/kg, 4-5 times higher than the typical power density of lithium-ion batteries and that of conventional Li—Se cells. This power density improvement is very significant in light of the notion that Li—Se cells, being conversion-type cells, operate on some chemical reactions during charge/discharge and, hence, typically would be expected to deliver very low power densities (typically <<500 W/kg).
3) Similar advantageous features are also observed with Na—Se cells and K—Se cells. This is evidenced by FIG. 9, which shows the Ragone plots (cell power density vs. cell energy density) of 4 alkali metal-selenium cells:

In summary, the present invention provides an innovative, versatile, and surprisingly effective platform materials technology that enables the design and manufacture of superior alkali metal-selenium rechargeable batteries. The alkali metal-selenium cell featuring a cathode layer containing particulates of selenium particles encapsulated by a elastomer exhibits a high cathode active material utilization rate, high specific capacity, high specific energy, high power density, little or no shuttling effect, and long cycle life. When a nanostructured carbon filament web is implemented at the anode to support a lithium film (e.g. foil), the lithium dendrite issue is also suppressed or eliminated.

The invention claimed is:

1. A rechargeable alkali metal-selenium cell selected from lithium-selenium cell, sodium-selenium cell, or potassium-selenium cell, comprising:

(a) an anode active material layer and an optional anode current collector supporting said anode active material layer;

(b) a cathode active material layer and an optional cathode current collector supporting said cathode active material layer; and (c) an electrolyte with an optional porous separator layer in ionic contact with said anode active material layer and said cathode active material layer;

wherein said cathode active material layer contains multiple particulates of a selenium-containing material selected from selenium, a selenium-carbon hybrid, selenium-graphite hybrid, selenium-graphene hybrid, conducting polymer-selenium hybrid, a metal selenide, a Se alloy or mixture with Sn, Sb, Bi, S, or Te, a selenium compound, or a combination thereof and wherein at least one of said particulates comprises one or a plurality of selenium-containing material particles being embraced or encapsulated by a thin layer of an elastomer having a recoverable tensile strain from 5% to 1,000% when measured without an additive or reinforcement being present in said polymer, a lithium ion conductivity no less than $10^{-7}$ S/cm at room temperature, and a thickness from 0.5 nm to 10 μm.

2. The rechargeable alkali metal-selenium cell of claim 1, wherein said selenium-carbon hybrid, selenium-graphite hybrid, selenium-graphene hybrid, or conducting polymer-selenium hybrid is a mixture, blend, composite, chemically or physically bonded entity of selenium or selenide with a carbon, graphite, graphene, or conducting polymer material.

3. The rechargeable alkali metal-selenium cell of claim 1, wherein said elastomer contains a material selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

4. The rechargeable alkali metal-selenium cell of claim 1, wherein said metal selenide contains $M_xSe_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

5. The rechargeable alkali metal-selenium cell of claim 4, wherein said metal element M is selected from Li, Na, K, Mg, Zn, Cu, Ti, Ni, Co, Fe, or Al.

6. The rechargeable alkali metal-selenium cell of claim 1, wherein said metal selenide contains $Li_2Se_1$, $Li_2Se_2$, $Li_2Se_3$, $Li_2Se_4$, $Li_2Se_5$, $Li_2Se_6$, $Li_2Se_7$, $Li_2Se_8$, $Li_2Se_9$, $Li_2Se_{10}$, $Na_2Se_1$, $Na_2Se_2$, $Na_2Se_3$, $Na_2Se_4$, $Na_2Se_5$, $Na_2Se_6$, $Na_2Se_7$, $Na_2Se_8$, $Na_2Se_9$, $Na_2Se_{10}$, $K_2Se_1$, $K_2Se_2$, $K_2Se_3$, $K_2Se_4$, $K_2Se_5$, $K_2Se_6$, $K_2Se_7$, $K_2Se_8$, $K_2Se_9$, or $K_2Se_{10}$.

7. The rechargeable alkali metal-selenium cell of claim 2, wherein said carbon or graphite material in said cathode active material layer is selected from mesophase pitch, mesophase carbon, mesocarbon microbead (MCMB), coke particle, expanded graphite flake, artificial graphite particle, natural graphite particle, highly oriented pyrolytic graphite, soft carbon particle, hard carbon particle, carbon nanotube, carbon nanofiber, carbon fiber, graphite nanofiber, graphite fiber, carbonized polymer fiber, activated carbon, carbon black, or a combination thereof.

8. The rechargeable alkali metal-selenium cell of claim 2, wherein said graphene is selected from pristine graphene, graphene oxide, reduced graphene oxide (RGO), graphene fluoride, nitrogenated graphene, hydrogenated graphene, doped graphene, functionalized graphene, or a combination thereof.

9. The rechargeable alkali metal-selenium cell of claim 1, wherein said conducting polymer-selenium hybrid contains an intrinsically conductive polymer selected from polyaniline, polypyrrole, polythiophene, polyfuran, a bi-cyclic polymer, a sulfonated derivative thereof, or a combination thereof.

10. The rechargeable alkali metal-selenium cell of claim 1, wherein said elastomer contains from 0.1% to 50% by weight of a lithium ion-conducting additive or sodium ion-conducting additive dispersed therein, or contains therein from 0.1% by weight to 10% by weight of a reinforcement nanofilament selected from carbon nanotube, carbon nanofiber, graphene, or a combination thereof.

11. The rechargeable alkali metal-selenium cell of claim 1, wherein said elastomer is mixed with a lithium ion-conducting additive to form a composite wherein said lithium ion-conducting additive is dispersed in said elastomer and is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x<1$ and $1<y<4$.

12. The rechargeable alkali metal-selenium cell of claim 1, wherein said elastomer is mixed with a lithium ion-conducting additive to form a composite wherein said lithium ion-conducting additive is dispersed in said elastomer and is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium NITRATE ($LINO_3$), LI-FLUOROALKYL-PHOSPHATE ($LIPF_3(CF_2CF_3)_3$), LITHIUM BISPERFLUORO-ethysulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

13. The rechargeable alkali metal-selenium cell of claim 1, wherein said elastomer is mixed with an electron-conducting polymer selected from polyaniline, polypyrrole, polythiophene, polyfuran, a bi-cyclic polymer, a sulfonated derivative thereof, or a combination thereof.

14. The rechargeable alkali metal-selenium cell of claim 1, wherein the elastomer forms a mixture or blend with a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, poly(vinylidene fluoride)-hexafluoropropylene (PVDF-HFP), a sulfonated derivative thereof, or a combination thereof.

15. The rechargeable alkali metal-selenium cell of claim 1, wherein said elastomer has a lithium ion conductivity or sodium ion conductivity from $10^{-5}$ S/cm to $5\times10^{-2}$ S/cm at room temperature.

16. The rechargeable alkali metal-selenium cell of claim 1, wherein said cell has a selenium utilization efficiency from 80% to 99%.

17. The rechargeable alkali metal-selenium cell of claim 1, wherein said electrolyte is selected from polymer electrolyte, polymer gel electrolyte, composite electrolyte, ionic liquid electrolyte, non-aqueous liquid electrolyte, soft matter phase electrolyte, solid-state electrolyte, or a combination thereof.

18. The rechargeable alkali metal-selenium cell of claim 1, wherein said electrolyte contains a salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoroethysulfonylimide (LiBETI), lithium bis(trifluoromethanesulfonyl)imide, lithium bis(fluorosulfonyl)imide, lithium trifluoromethanesulfonimide (LiTFSI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

19. The rechargeable alkali metal-selenium cell of claim 18, wherein said solvent is selected from ethylene carbonate (EC), dimethyl carbonate (DMC), methylethyl carbonate (MEC), diethyl carbonate (DEC), ethyl propionate, methyl propionate, propylene carbonate (PC), y-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

20. The rechargeable alkali metal-selenium cell of claim 1, wherein said anode active material layer contains an anode active material selected from lithium metal, sodium metal, potassium metal, a lithium metal alloy, sodium metal alloy, potassium metal alloy, a lithium intercalation compound, a sodium intercalation compound, a potassium intercalation compound, a lithiated compound, a sodiated compound, a potassium-doped compound, lithiated titanium dioxide, lithium titanate, lithium manganate, a lithium transition metal oxide, $Li_4Ti_5O_{12}$, or a combination thereof.

21. The rechargeable alkali metal-selenium cell of claim 1, wherein said cell is a lithium ion-selenium cell and said anode active material layer contains an anode active material selected from the group consisting of:

(a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe) and cadmium (Cd), and lithiated versions thereof;

(b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric;

(c) oxides, carbides, nitrides, selenides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof;

(d) salts and hydroxides of Sn and lithiated versions thereof;

(e) carbon or graphite materials and prelithiated versions thereof; and combinations thereof.

22. The rechargeable alkali metal-selenium cell of claim 1, wherein said cell is a sodium ion-selenium cell or potassium ion-selenium cell and said anode active material layer contains an anode active material selected from the group consisting of:

(a) sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;

(b) sodium- or potassium-containing alloys or intermetallic compounds of Si, Ge, Sn, Pb, Sb, Bi, Zn, Al, Ti, Co, Ni, Mn, Cd, and their mixtures;

(c) sodium- or potassium-containing oxides, carbides, nitrides, selenides, phosphides, selenides, tellurides, or antimonides of Si, Ge, Sn, Pb, Sb, Bi, Zn, Al, Fe, Ti, Co, Ni, Mn, Cd, and mixtures or composites thereof, (d) sodium or potassium salts;

(e) particles of graphite, hard carbon, soft carbon or carbon particles and pre-sodiated versions thereof; and combinations thereof.

23. The rechargeable alkali metal-selenium cell of claim 1, wherein said particulates contain from 80% to 99% by weight of selenium, metal selenide, or selenium metal compound based on the total weight of said high-capacity polymer and said selenium, metal selenide, or selenium metal compound combined.

24. A cathode active material layer for a rechargeable alkali metal-selenium cell, wherein said cathode active material layer contains multiple particulates of a selenium-containing material selected from a selenium-carbon hybrid, selenium-graphite hybrid, selenium-graphene hybrid, conducting polymer-selenium hybrid, a metal selenide, a Se alloy or mixture with Sn, Sb, Bi, S, or Te, a selenium compound, or a combination thereof and wherein at least one of said particulates comprises one or a plurality of selenium-containing material particles being fully embraced or encapsulated by a thin layer of an elastomer having a recoverable tensile strain no less than 5% when measured without an additive or reinforcement, a lithium ion conductivity no less than $10^{-7}$ S/cm at room temperature, and a thickness from 0.5 nm to 10 μm.

25. The cathode active material layer of claim 24, wherein said selenium-carbon hybrid, selenium-graphite hybrid, selenium-graphene hybrid, or conducting polymer-selenium hybrid is a mixture, blend, composite, chemically or physically bonded entity of selenium or selenide with a carbon, graphite, graphene, or conducting polymer material.

26. The cathode active material layer of claim 24, wherein said elastomer contains a material selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

27. The cathode active material layer of claim 24, wherein said metal selenide contains $M_xSe_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

28. The cathode active material layer of claim 25, wherein said carbon or graphite material in said cathode active material layer is selected from mesophase pitch, mesophase carbon, mesocarbon microbead (MCMB), coke particle, expanded graphite flake, artificial graphite particle, natural graphite particle, highly oriented pyrolytic graphite, soft carbon particle, hard carbon particle, carbon nanotube, carbon nanofiber, carbon fiber, graphite nanofiber, graphite fiber, carbonized polymer fiber, activated carbon, carbon black, or a combination thereof.

29. The cathode active material layer of claim 28, wherein said metal polyselenide contains $M_xSe_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

30. The cathode active material layer of claim 24, further comprising a binder resin that bonds said multiple particulates together to form said cathode active material layer, wherein said binder resin is not part of said multiple particulates and is external to said multiple particulates.

31. A cathode active material layer for a rechargeable alkali metal-selenium cell, wherein said cathode active material layer contains a resin binder, an optional conductive additive, and multiple particles of a selenium-containing material selected from a selenium-carbon hybrid, selenium-graphite hybrid, selenium-graphene hybrid, conducting polymer-selenium hybrid, a metal selenide, a Se alloy or mixture with Sn, Sb, Bi, S, or Te, a selenium compound, or a combination thereof, wherein said selenium-containing material particles are bonded by said resin binder to form an integral solid layer, and wherein said integral solid layer is covered and protected by a thin layer of an elastomer having a recoverable tensile strain no less than 5% when measured without an additive or reinforcement, a lithium ion conductivity no less than $10^{-7}$ S/cm at room temperature, and a thickness from 0.5 nm to 10 μM.

32. The cathode active material layer of claim 31, wherein said integral solid layer is bonded to a cathode current collector by said resin binder.

33. A rechargeable alkali metal-selenium cell selected from lithium-selenium cell, sodium-selenium cell, or potassium-selenium cell, said alkali metal-selenium cell comprising: (a) an anode active material layer and an optional anode current collector supporting said anode active material layer; (b) a cathode containing the cathode active material layer of claim 31; and (c) an electrolyte with an optional porous separator layer in ionic contact with said anode active material layer and said cathode active material layer.

34. A powder mass for a lithium-selenium battery cathode, said powder mass comprising multiple particulates of a selenium-containing material selected from a selenium-carbon hybrid, selenium-graphite hybrid, selenium-graphene hybrid, conducting polymer-selenium hybrid, metal selenide, a Se alloy or mixture with Sn, Sb, Bi, S, or Te, a selenium compound, or a combination thereof and wherein at least one of said particulates comprises one or a plurality of selenium-containing material particles being embraced or encapsulated by a thin layer of an elastomer having a recoverable tensile strain no less than 5% when measured without an additive or reinforcement, a lithium ion conductivity no less than $10^{-7}$ S/cm at room temperature, and a thickness from 0.5 nm to 10 μm.

35. The powder mass of claim 34, wherein said selenium-carbon hybrid, selenium-graphite hybrid, selenium-graphene hybrid, or conducting polymer-selenium hybrid is a mixture, blend, composite, chemically or physically bonded entity of selenium or selenide with a carbon, graphite, graphene, or conducting polymer material.

36. The powder mass of claim 34, wherein said elastomer contains a material selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

37. The powder mass of claim 34, wherein said metal selenide contains $M_xSe_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

* * * * *